(12) United States Patent
Singh et al.

(10) Patent No.: US 12,386,614 B2
(45) Date of Patent: Aug. 12, 2025

(54) ADAPTIVE CODE SCANNING

(71) Applicant: ORACLE INTERNATIONAL CORPORATION, Redwood Shores, CA (US)

(72) Inventors: Rohit Kumar Singh, Newark, CA (US); Arjit Khullar, Toronto (CA); Ankita Singh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/218,263

(22) Filed: Jul. 5, 2023

(65) Prior Publication Data

US 2025/0013464 A1    Jan. 9, 2025

(51) Int. Cl.
  *G06F 8/71*  (2018.01)
  *G06F 8/10*  (2018.01)
  (Continued)

(52) U.S. Cl.
  CPC .............. *G06F 8/75* (2013.01); *G06F 8/10* (2013.01); *G06F 8/35* (2013.01); *G06F 8/41* (2013.01);
  (Continued)

(58) Field of Classification Search
  CPC ..... G06F 8/75; G06F 8/10; G06F 8/35; G06F 8/433; G06F 8/427; G06F 8/71;
  (Continued)

(56) References Cited

U.S. PATENT DOCUMENTS 10,853,060 B2   12/2020   Kimball et al.
11,210,110 B2   12/2021   Seshadri et al.
(Continued)

OTHER PUBLICATIONS

Udayan Khurana et al., Feature Engineering for Predictive Modeling using Reinforcement Learning, 2017, [Retrieved on Mar. 20, 2025]. Retrieved from the internet: <URL: https://chu-data-lab.github.io/088803Fall2018/088803-Fall2018-DML-Papers/feature-engineering-reinforcement-learning.pdf> 8 Pages (1-8) (Year: 2017).*

(Continued)

*Primary Examiner* — Anibal Rivera
(74) *Attorney, Agent, or Firm* — Kraguljac Law Group LLC

(57) ABSTRACT

Systems, methods, and other embodiments associated with adaptive code scanning are described. In one example method, a valid configuration that specifies approved parameters of use for a software component is defined. Software code is scanned to detect that the software component exists in the software code. Where the component is detected, the software code is scanned to identify implemented parameters of use for the software component. The implemented parameters are compared to the approved parameters. Based on the comparison, the software component is determined to be not implemented according to the valid configuration. Where the software component is implemented according to the valid configuration, the method automatically determines to proceed with the automated action based on the implemented parameters. The automated action is performed to adapt to the implemented parameters.

20 Claims, 7 Drawing Sheets

(51) Int. Cl.
*G06F 8/35* (2018.01)
*G06F 8/41* (2018.01)
*G06F 8/54* (2018.01)
*G06F 8/75* (2018.01)
*G06F 9/445* (2018.01)
*G06F 9/455* (2018.01)
*G06F 8/72* (2018.01)
*G06F 16/25* (2019.01)
*G06F 16/901* (2019.01)
*G06F 21/55* (2013.01)
*G06F 21/57* (2013.01)
*G06F 21/64* (2013.01)

(52) U.S. Cl.
CPC .............. *G06F 8/427* (2013.01); *G06F 8/433* (2013.01); *G06F 8/443* (2013.01); *G06F 8/54* (2013.01); *G06F 8/71* (2013.01); *G06F 8/72* (2013.01); *G06F 9/44521* (2013.01); *G06F 9/45504* (2013.01); *G06F 9/45558* (2013.01); *G06F 16/254* (2019.01); *G06F 16/9024* (2019.01); *G06F 21/552* (2013.01); *G06F 21/57* (2013.01); *G06F 21/64* (2013.01)

(58) Field of Classification Search
CPC ..... G06F 8/41; G06F 8/54; G06F 8/72; G06F 8/443; G06F 21/552; G06F 21/64; G06F 21/57; G06F 16/254; G06F 16/9024; G06F 9/44521; G06F 9/45504; G06F 9/45558
See application file for complete search history.

(56) References Cited

U.S. PATENT DOCUMENTS

| | | | | |
|---|---|---|---|---|
| 2006/0293934 | A1* | 12/2006 | Tsyganskiy | G06F 8/34 705/7.29 |
| 2006/0294158 | A1* | 12/2006 | Tsyganskiy | G06F 8/72 |
| 2011/0265063 | A1* | 10/2011 | de Oliveira Costa | G06F 8/75 717/120 |
| 2021/0081837 | A1* | 3/2021 | Polleri | G06N 5/022 |
| 2022/0391541 | A1* | 12/2022 | Novotny | G06F 21/57 |

OTHER PUBLICATIONS

CODACY; Codacy, 2022, pp. 1-4; downloaded on Dec. 2, 2022 from: https://www.codacy.com/product.

CODACY: Quality Repository Dashboard; last modified Aug. 26, 2022; pp. 1-8; downloaded on Dec. 2, 2022 from: https://docs.codacy.com/repositories/repository-dashboard.

CAST; Cast Imaging Capabilities; pp. 1-3; downloaded on Dec. 2, 2022 from: https://learn.castsoftware.com/imaging/capabilities.

CAST; Cast Imaging Add-On Modules; pp. 1-4; downloaded on Dec. 2, 2022 from: https://learn.castsoftware.com/imaging/add-on-modules.

Codescan Enterprises; The CodeScan Shield Solution; pp. 1-6; downloaded on Dec. 2, 2022 from: https://www.codescan.io/.

Josh Rank; Codescan Enterprises; CodeScan Shield Enhanced Data Quality, Security, and Accountability; Sep. 21, 2022; pp. 1-4.

SONATYPE; Sonatype Life Code Quality Analysis Platform; pp. 1-4; downloaded Dec. 2, 2022 from: https://www.sonatype.com/lift/sedaily.

SONATYPE: Sonatype—The Component Information Panel; pp. 1-6; downloaded Dec. 2, 2022.

SONATYPE; Sonatype—Component Details Page; pp. 1-6; Dec. 7, 2022.

SONATYPE; Sonatype—Migration Scorecard; pp. 1-4; Dec. 7, 2022.

SONATYPE; Sonatype—Stack Divergence; pp. 1-6; downloaded Dec. 2, 2022.

SONATYPE; Sonatype—Success Metrics; pp. 1-16; downloaded Dec. 2, 2022.

Robert Chatley et al.; Diggit Automated Code Review Via Software Repository Mining; pp. 1-5; downloaded on Dec. 2, 2022 from: https://www.doc.ic.ac.uk/~rbc/papers/saner-diggit-18.pdf.

Miroslaw Ochodek, et al.; Recognizing Lines of Code Violating Company-Specific Coding Guidelines Using Machine Learning; pp. 1-46; Published Nov. 14, 2019; Empirical Software Engineering (2020).

David Petersson; CNN vs. RNN: How are they different?; published Mar. 24, 2021; pp. 1-8.

* cited by examiner

ADAPTIVE CODE SCANNING

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
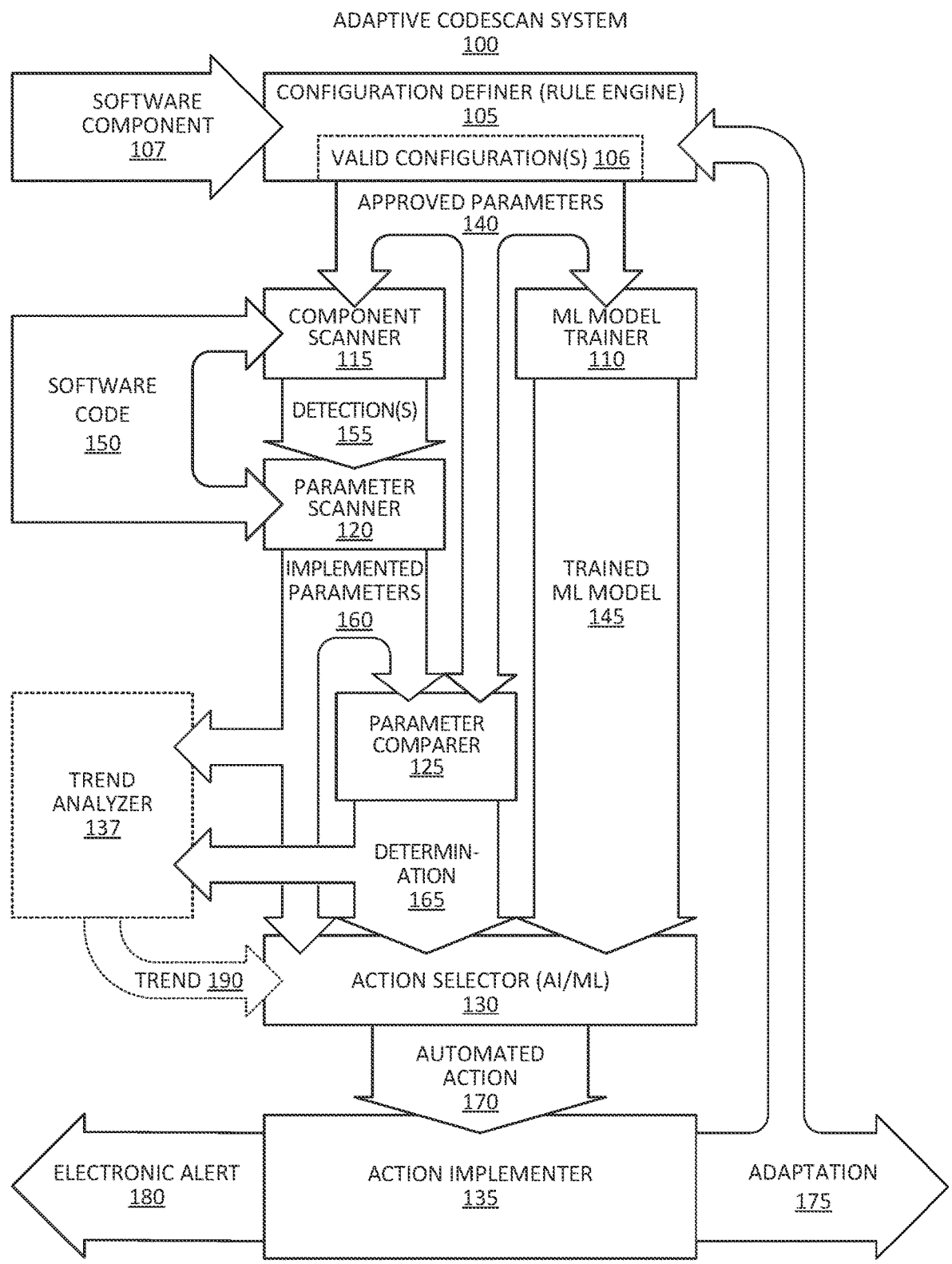
FIG. 1 illustrates one embodiment of an adaptive codescan system associated with detection of and adaptation to unapproved uses of software components in a body of software code.

In one embodiment, systems, methods, and other embodiments are disclosed herein that provide a machine learning tool for adaptive code scanning to detect and adapt to unapproved uses of software components in a body of software code. In one embodiment, an adaptive codescan system distinguishes which patterns of use for software components that do not conform to prescribed parameters are potentially valid, and then automatically adopts the patterns as approved configurations. In other words, the adaptive codescan system observes and/or learns how users actually employ a software component and automatically expands the approved uses and/or revises the software component to be consistent with the actual use by the users.

In one embodiment, the adaptive codescan system scans software code (e.g., in a codebase) to find parameters of use under which a software component is actually implemented. These implemented parameters are compared to prescribed or approved parameters for use of the software component. Where the implemented parameters and approved parameters differ, in one embodiment, an artificial intelligence/ machine learning (AI/ML) model decides whether the implemented parameters are also to be added to a set of approved parameters for use of the software component, or some other action is to be taken. In one embodiment, the adaptive codescan system thus improves the technology of codebase management by autonomously extracting patterns of usage for shared software components from codebases and automatically approves extracted usage patterns that enhance code quality. In one embodiment, the adaptive codescan system improves the technology of codebase management by leveraging AI/ML to learn what usage patterns are likely to be approved, and using the AI/ML to autonomously approve such patterns as new valid configurations, or autonomously take other actions to manage the codebase or adjust the code scanner.

Also, in one embodiment, the adaptive codescan system can generate reports of code usage, accept feedback regarding the code usage, use the feedback to refine the accuracy of the AI/ML engine, use the more accurate AI/ML in a subsequent release or run to catch and assess new violations, new components, or new usages of software components in shared libraries. Further, adaptive codescan system may autonomously make changes to approved usage parameters in response to a trend of using a reusable software component in a particular unapproved way. In one embodiment, the adaptive codescan system is thus autonomously self-improving, becomes a more accurate arbiter of what component usages are valid or approved, becomes smarter, and progressively generates more and more correct analytic reports of software component usage.

As a simple example, consider an HTML page in a codebase. The HTML page is built using pre-defined software components. Adaptive code scanning system will scan to determine if particular components are being used as intended. Use of a software component "as intended" or "as designed" refers to implementation of the software component in the software code according to a valid configuration that is pre-approved. The HTML page includes custom elements that are specific to the page as well as reusable software components such as an embedded video player and associated controls. The manager of the codebase may specify the parameters of use for the video player and control reusable components that are allowable within the codebase. For example, the video player may be specified to be embedded only within a first type of HTML page such as a base page, and not within a second type of HTML page such as a drawer page. By obtaining and comparing parameters of the page in the codebase that includes the video player against approved parameters for pages in are allowed to include the video player, the adaptive codescan system can determine whether or not the use of the video player as implemented in the codebase is approved or permitted. But, a base page implemented by a user may have different parameters than initially envisioned by the administrators of the codebase. Advantageously, then, the adaptive codescan system uses ML to automatically determine that the parameters surrounding use of the video player are sufficiently similar to the approved base page and then automatically include the parameters as implemented by the user as a valid or approved use of the video player. The adaptive codescan system thus learns or adapts to valid usages within the code structure (such within as the HTML code) that do not fit initially designed or approved parameters.

Or, in another simple example, the embedded video player—the reusable software component—may be able to play various video file formats, but the manager of the codebase may specify that the video player should be limited to playing MP4 format files. The adaptive codescan system may acquire parameters such as file type of the input to the video player to verify that a page in the codebase is complying with the format requirement. Where a page implemented in the codebase is playing a different file format, such as OGG format files, the adaptive codescan system can learn whether this is an acceptable use or not based on an approval or disapproval of the use by an administrator of the codebase. For example, the adaptive codescan system can learn where the administrator will likely allow the use, or will likely disallow the use and send a message to the user who chose the OGG format that the format is not allowed. Where the administrator disapproves the use, the adaptive codescan system learns the parameters under which the administrator rejected use of the new input file type, and automatically performs the 'disallow and send message' action in response to future uses of non-approved file types with similar parameters. Alternatively, where a new file type is allowed by the administrator, the adaptive codescan system learns the parameters under which the new file type is allowed, and automatically adds future usages of a new file type to the allowed usage parameters when the parameters are similar to those under which the new file type was allowed.

Thus, in one embodiment, the adaptive codescan system autonomously adapts to the changing usage of reusable components in the codebase or other body of code monitored by the adaptive codescan system. While simple examples are described herein with reference to an HTML codebase, in one or more embodiments, the adaptive codescan systems and methods described herein are generalizable for adaptive code scanning of a wide variety of codebases or bodies of software code.

—Example Adaptive Codescan System—

FIG. 1 illustrates one embodiment of an adaptive codescan system 100 associated with detection of and adaptation to unapproved uses of software components in a body of software code. Adaptive codescan system 100 includes components for automatically identifying whether or not to adapt to a non-approved use when a software component is used in a non-approved way. In one embodiment, the components of adaptive codescan system 100 include a configuration definer 105, ML model trainer 110, component scanner 115, parameter scanner 120, parameter comparer 125, action selector 130, and action implementer 135. In one embodiment, adaptive codescan system 100 further includes a trend analyzer 137.

In one embodiment, configuration definer 105 is configured to define one or more valid configurations 106 for a software component 107. The valid configuration 106 specifies approved parameters of use 140 for the software component 107. In one embodiment, configuration definer 105 is configured to create or update one or more valid configurations 106 in a rule engine, such as rule engine 320 shown and described with respect to FIG. 3.

In one embodiment, ML model trainer 110 is configured to train a machine learning model 145 to decide whether to proceed with an automated action. For example, the automated action is a way in which the adaptive codescan system 100 may respond or adapt to non-approved uses of the software component 107. Training of the machine learning model 145 is based at least in part on the approved parameters 140 of use. In one embodiment, ML model trainer 110 is configured to train ML models such as those employed in AI/ML 330 shown and described with respect to FIG. 3. In one embodiment, ML model trainer 110 is configured to train ML model 145 as shown and described with reference to FIG. 5.

In one embodiment, component scanner 115 is configured to scan software code 150 to detect that the software component 107 exists (as indicated at detection 155) in the software code 150. And, in one embodiment, parameter scanner 120 is configured to, in response to detection 155 of the software component 107, scan the software code 150 to identify implemented parameters of use 160 for the detected software component 107. For instance, parameter scanner 120 is configured to analyze software code 150 to detect the implemented parameters of use 160 that show a configuration of an instance of the software component 107.

Then, in one embodiment, parameter comparer 125 is configured to compare the implemented parameters 160 of use as found in the software code 150 to the approved parameters of use 140 for the software component 107. And, based on the comparison, parameter comparer 125 is also configured to make a determination 165. The determination 165 indicates whether the software component 107 is, or is not, used in the software code 150 as designed. In other words, the determination 165 indicates whether or not the software component is implemented in the software code 150 according to the valid configuration 106. More particularly, the determination 165 indicates whether or not the software component 107 is configured in the software code 150 consistently with the approved parameters 140 that are specified by the valid configuration 106. In one embodiment, component scanner 115 is configured in a manner similar to adaptive scan 315 to detect the software component in a codebase 310, as shown and described with reference to FIG. 3.

In one embodiment, action selector 130 is configured to, in response to the determination that the software component 107 is not used as designed, automatically determine to proceed with the automated action 170. In other words, action selector 130 is configured to automatically choose to proceed with the automated action 170 where the action selector 130 determines that the software component 107 is not implemented in the software code 150 according to the valid configuration 106. In one embodiment, action selector 130 is configured to execute trained ML model 145 to make the automatic determination to proceed with the automated action 170. In one embodiment, the trained ML model 145 determines to proceed with the automated action 170 based at least in part on the implemented parameters of use 160. In one embodiment, action selector 130 is configured to choose the automated action 170 from among a collection of available automated actions (such as the automated actions described below with reference to process block 215).

In one embodiment, action implementer 135 is configured to perform the automated action 170 to adapt to the implemented parameters of use 160 for the software component 107. In one embodiment, the resulting adaptation 175 may be applied to define an additional valid configuration 106 for the software component 107 in configuration definer 105. Or in one embodiment, the resulting adaptation 175 may alter the software component 107 itself based on the implemented parameters 160. In additional embodiments, action implementer 135 is configured to perform one or more automated actions chosen by action selector 130.

In one embodiment, performing the automated action 170 generates an electronic alert 180. Electronic alert 180 is an adaptive response that indicates that the software component 107 is not used as designed, that is, not implemented according to valid configurations 106. Action implementer 135 is configured to transmit the resulting electronic alert 180—including information describing the approved parameters for use of the software component 107—to a user interface for a user associated with the software component 107.

In one embodiment, trend analyzer 137 is configured to automatically analyze implemented parameters 160 and determinations for usages of the software component 107 over a period of time to discover a trend 190 associated with the implemented parameters 160 for the software component. In one embodiment, trend analyzer 137 is configured to automatically transmit the trend 190 to action selector 130 for inclusion in the basis of the determination to proceed with the automated action.

Further details regarding adaptive codescan system 100 are presented herein. In one embodiment, operation of adaptive codescan system 100 will be described with reference to example adaptive code scanning method 200 shown in FIG. 2. In one embodiment, an example architecture for adaptive code scanning 300 will be described with reference to FIG. 3. In one embodiment, an example trend report graphical user interface 400 associated with adaptive code scanning will be described with reference to FIG. 4. In one embodiment, an overview of AI/ML model training and testing 500 associated with adaptive code scanning will be described with reference to FIG. 5. In one embodiment, an overview of AI/ML model runtime 600 associated with adaptive code scanning will be described with reference to FIG. 6.

—Example Adaptive Code Scanning Method—

Figure 2:
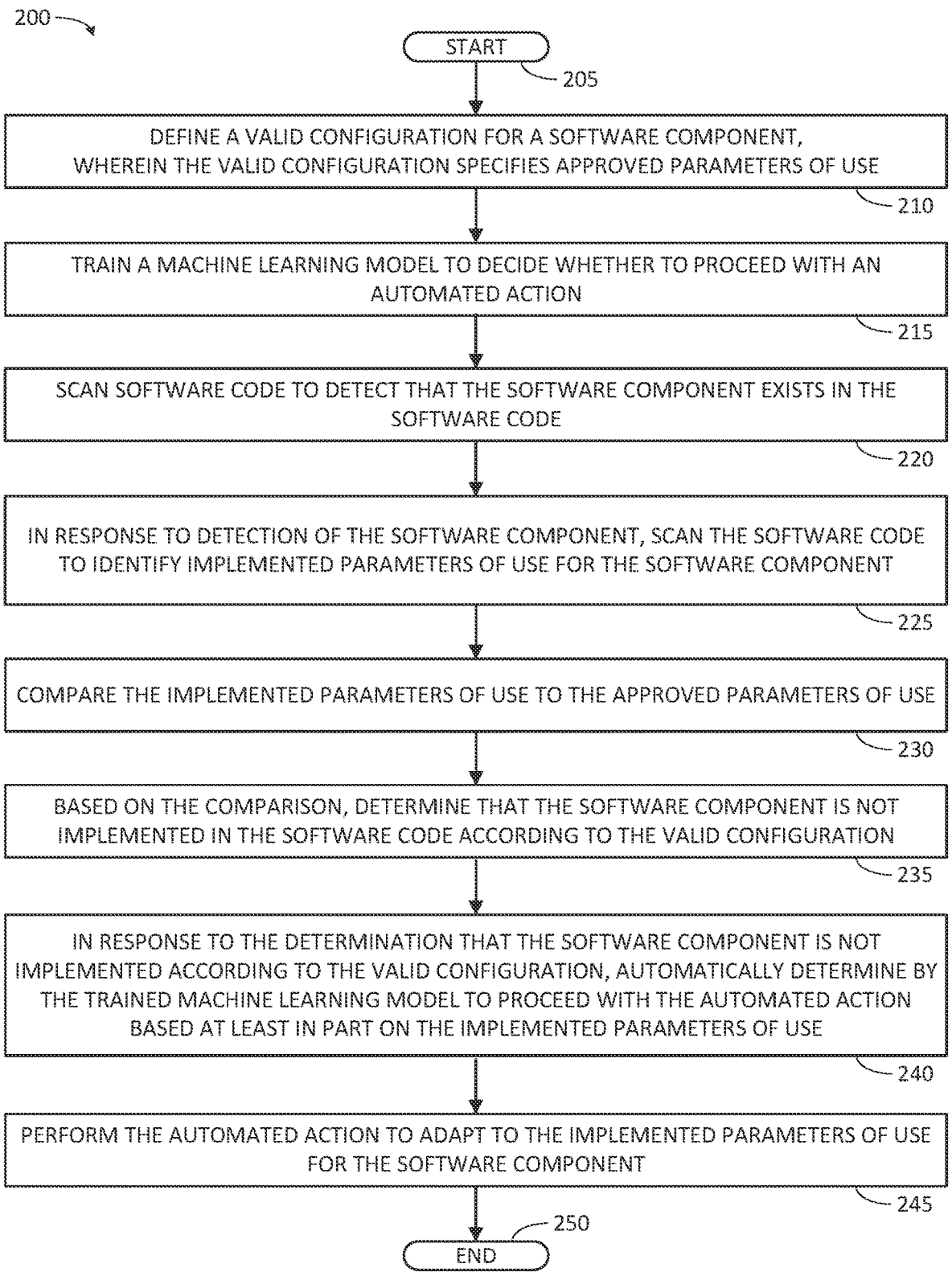
FIG. 2 illustrates one embodiment of an adaptive code scanning method associated with detection of and adaptation to unapproved uses of software components in a body of software code.

FIG. 2 illustrates one embodiment of an adaptive code scanning method 200 associated with detection of and adaptation to unapproved uses of software components in a body of software code. In one embodiment, the adaptive code scanning method 200 provides a tool to automatically adapt configuration rules to allow previously un-permitted configurations of use, automatically enhance code to implement new configurations of use, or perform other automatic actions. In one embodiment, adaptive code scanning method 200 scans a body of software code to determine whether components in the body of software code are being used properly. In one embodiment, adaptive code scanning method 200 updates the specification of what uses are proper for a software component based on new uses in the body of code that are consistent with existing proper uses. In one embodiment, the adaptive code scanning method generates an output report about how software components are being used in the body of software code and makes smart recommendations for actions to improve software components.

As an overview, in one embodiment, the adaptive code scanning method 200 initially specifies uses of the software component that are acceptable. A machine learning model is trained (based on the specified uses) to determine whether or not to automatically adapt the specified uses to cover other actual uses. A body of software code (such as a codebase) is parsed to detect the software component in the software code. And, where the software component is detected, the adaptive code scanner captures the parameters with which the software component is being used in the software code. The parameters for the way the software component is used in the code are then compared to the parameters as specified to determine whether the use is or is not a use in a way that is designed or specified for the software component. Where the component is not used as specified, the ML model is used to analyze whether or not to automatically add this use to the specification (or take another action). The selected action is then performed, for example, to automatically update the parameters of use for the software component.

In one embodiment, adaptive code scanning method 200 initiates automatically at START block 205 in response to an adaptive code scanning system (such as adaptive code scanning system 100) determining one or more of (i) that there has been a change (such as a create, update, or deletion to some portion of the software code); (ii) that an instruction to perform adaptive code scanning method 200 on software code has been received; (iii) a user or administrator of an adaptive code scanning system has initiated adaptive code scanning method 200; (iv) it is currently a time at which adaptive code scanning method 200 is scheduled to be run (e.g., daily, weekly, etc.); (v) that a library of software components has been designated to be a new version or release; or (vi) that adaptive code scanning method 200 should commence in response to occurrence of some other condition. Outputs described herein may be written to memory or storage, for example in a data structure, for subsequent retrieval or use. Inputs described herein may be accessed or retrieved from memory or storage and made available for use.

For example, the adaptive code scanning method 200 may be configured to run a scan of the software code daily. Or for example, the adaptive code scanning method 200 may be configured detect a change or modification to some portion of software code in a codebase, and in response to the detection, configured to scan the modified portion of the software code. In one embodiment, the adaptive code scanning method 200 is configured to execute in conjunction with a version release of software component libraries, for example, scanning and updating at least once a quarter in conjunction with a quarterly release schedule for a software component library. In one embodiment, a computer system configured by computer-executable instructions to execute functions of adaptive code scanning system 100 executes adaptive code scanning method 200. Following initiation at start block 205, adaptive code scanning method 200 continues to process block 210.

—Example Code Scanning Method-Defining Valid Configurations—

At process block 210, adaptive code scanning method 200 defines a valid configuration for a software component. The valid configuration specifies approved parameters of use. In one embodiment, adaptive code scanning method 200 accepts and stores a description of what is acceptable usage for a software component. In one embodiment, the descriptions are logical rules. The logical rules evaluate whether a configuration of use for the software component is an allowed use based on information obtained or derived from the code in which the software component is being used.

As used herein, the term "software component" refers to a data item that encapsulates or combines a set of related functions or data, such as a software module, software object, or user interface building blocks. In one embodiment, a software component may be reusable in multiple applications. In one embodiment, a software component may be shared infrastructure available for use by multiple users. In one embodiment, the adaptive code scanning method 200 may be applied where there is a digital library or repository of components, such as software components. For example, the library is a collection of reusable parts of a software platform. For example, the library may be a back-end library used across a software platform. Or, the library may be a third-party library accessed by the platform. Different users who are building software applications in the codebase may use the repository of reusable components. In one embodiment, adaptive code scanning method 200 may be used for a library of images or other artefacts of diverse types.

In one embodiment, to define a valid configuration, a rule that describes the valid configuration is recorded in a rule engine (such as rule engine 320). For example, the rules are logical rules that evaluate to "true" where the configurations are valid (as discussed below). In one embodiment, a rule includes as variables one or more parameters that describe the circumstances of the use of the software component. The rule engine thus contains component configurations for each software component that is to be scanned for and analyzed. Initially, these rules or "behavior configurations" are manually created by a designer who knows the software component and how the software component works. A component has one or more pre-defined configurations (initially manually created) that identify what is considered to be correct uses of the component. The correct uses of the component are stored as rules in the rule engine. As discussed below, the rules may be revised or supplemented based on the component configurations for the software component as implemented by users in codebase or other body of software code.

As used herein, a codebase refers to a code repository for one or more software projects. For example, the codebase may include: (i) source code files that contain programming code for modules, classes, functions, methods, or other code elements that define functionality of software; (ii) configuration files that provide settings that control behavior of the software, such as selections for options, database connections, and application programming interface (API) configurations; (iii) files or other resources used in operation of the software that are not part of source code, such as images, icons, media files, or templates; (iv) build scripts that automate compilation, packaging, and deployment of the software project; (v) dependencies and libraries that provide additional functionality to that of the source code.

In one embodiment, the valid configurations are approved usages of a software component. The valid or approved usages define the usages of the component that are allowed or intended for the software component. In one embodiment, the valid configurations describe or specify ways to use the software component that are approved or intended by the user. Approved ways to use a component are specified or recorded, for example in the rule engine. Non-approved ways to use a component need not be specified. In one embodiment, non-approved configurations are detected by scanning implemented software code in the codebase (for example as described below).

In one embodiment, adaptive code scanning method 200 presents a prompt in a user interface to enter one or more valid configurations for a software component. In one embodiment, the prompt requests input of a value or range of values for one or more parameters that describe a configuration of use that is valid for the software component. In one embodiment, the prompt requests input of logical operators (such as AND, OR, NOT, equal to, greater than, less than, etc.) to apply to the parameters. Adaptive code scanning method 200 then accepts a user input of the valid configuration(s) through the user interface. For example, adaptive code scanning method 200 accepts the parameter values or ranges of values that are valid for the software component along with operators to spell-out one or more rules to apply to the software component. In one embodiment, adaptive code scanning method retrieves a configuration file that contains one or more rules to apply to the software component. Adaptive code scanning method 200 then writes the one or more rules into a rule engine 320 (or other data structure) in association with the software component. These recorded rules describe approved parameters 140 of use. In this way, adaptive code scanning method 200 may define one or more valid configurations that specify valid or approved parameters of use for the software component.

Process block 210 then completes, and adaptive code scanning method 200 proceeds to process block 215. In one embodiment, the functions of process block 210 are performed by configuration definer 105 of adaptive code scanning system 100. Additional detail regarding defining valid configurations (or approved configurations) for a software component is discussed below, for example with reference to rule engine 320.

—Example Code Scanning Method—ML Model Training—

At process block 215, adaptive code scanning method 200 trains a machine learning model to decide whether to proceed with an automated action. The decision is based at least in part on the approved parameters of use. For example, the ML model is trained with feature vectors of the parameters of use for valid configurations of the software component. In one embodiment, expected outcomes of actions taken for the valid configurations are also provided as training inputs.

In one embodiment, the outcomes indicate that the configuration was determined to be placed in the rule engine 320 (and would be automatically added to the rule engine if the configuration were not already present in the rule engine). In one embodiment, the ML model is further trained on feature vectors that include parameters of use for invalid configurations for which the invalid configuration is chosen by the user to be added to rule engine 320 as a new valid configuration. In one embodiment, the feature vector includes trend 190 information related to usage of the software component. For example, the trend information may describe how much a particular configuration of parameters for a software component has increased/decreased in use since a previous point in time, such as a previous release of a software component. As used herein, the term "feature vector" refers to an array-like data structure for representing parameters of use or other features that is configured to be used as input to the ML model.

Figure 3:
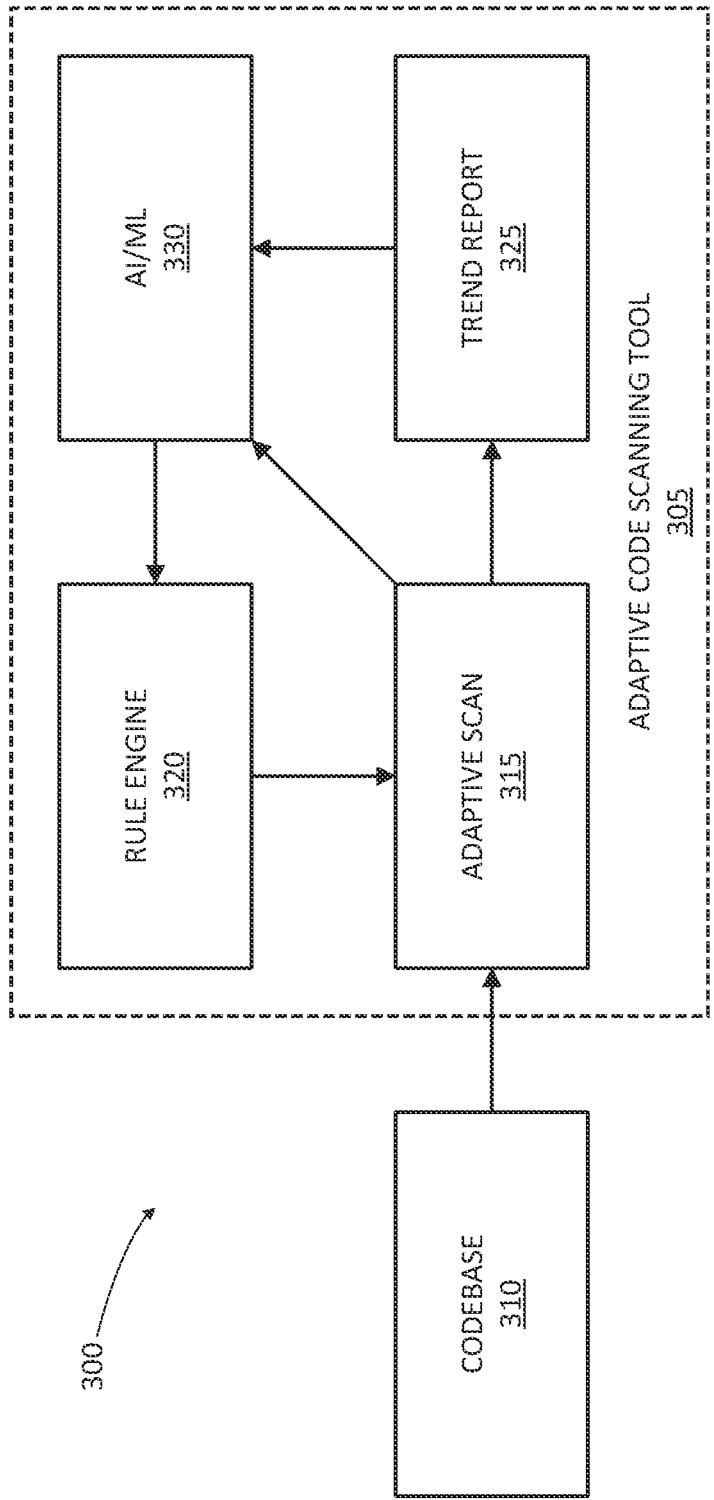
FIG. 3 illustrates one embodiment of an example architecture for adaptive code scanning associated with detection of and adaptation to unapproved uses of software components in a body of software code.
Figure 5:
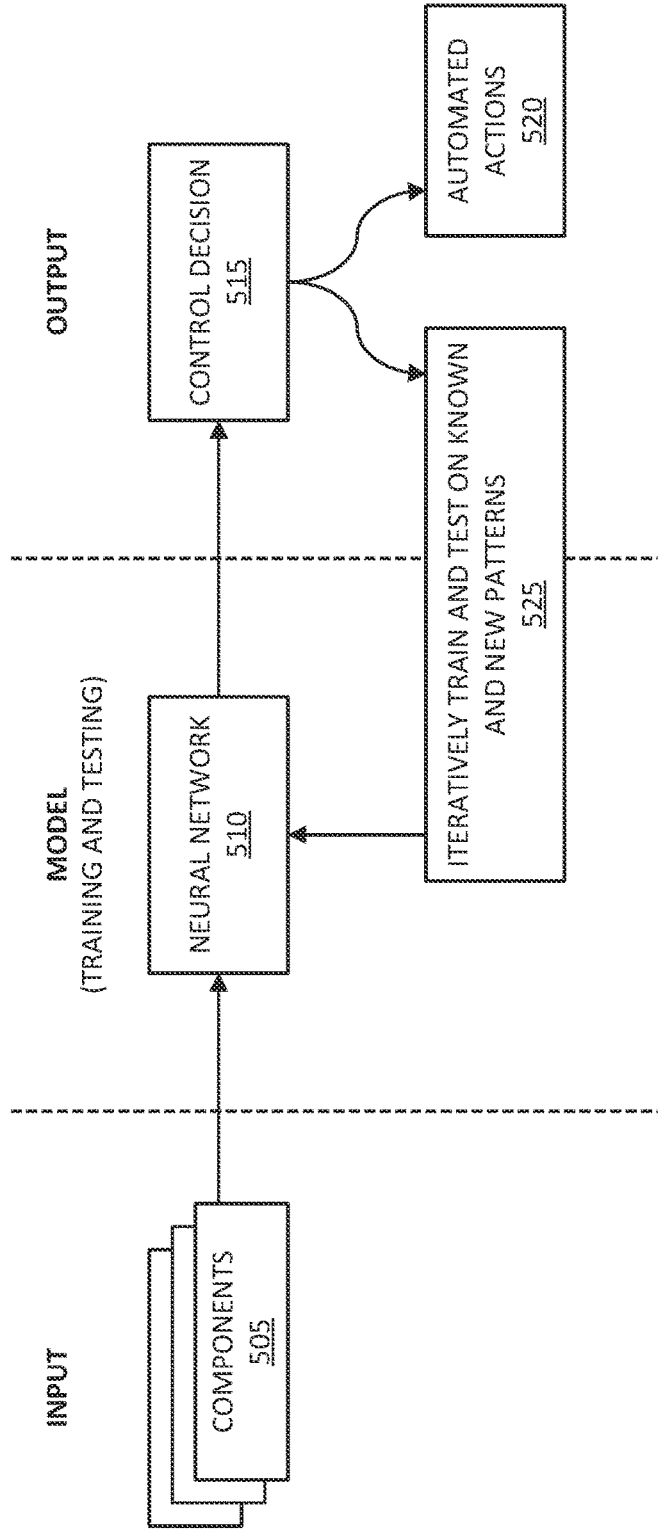
FIG. 5 illustrates one embodiment of an example AI/ML model training process for adaptive code scanning associated with detection of and adaptation to unapproved uses of software components in a body of software code.
Figure 6:
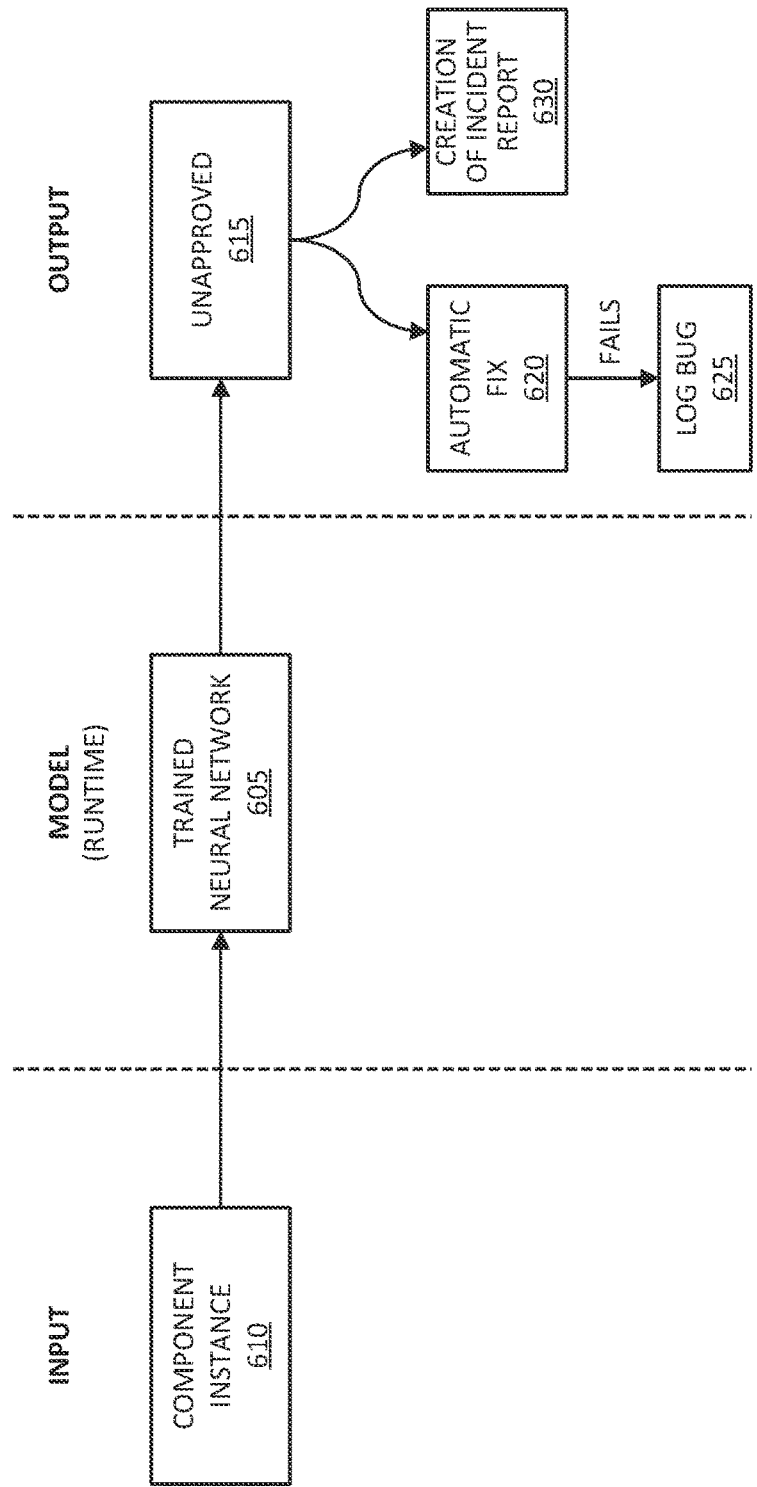
FIG. 6 illustrates one embodiment of an example AI/ML model runtime for adaptive code scanning associated with detection of and adaptation to unapproved uses of software components in a body of software code.

In one embodiment, the machine learning model is a classification model such as AI/ML 330, as shown and described in further detail herein with reference to FIGS. 3, 5, and 6. In one embodiment, the classifications determined by the ML model are classes of either proceeding or not proceeding with one or more automated actions. For example, the ML model is trained to decide whether or not to proceed with a plurality of automated actions. In addition to determining whether or not to (i) automatically generate a rule for a newly-approved configuration for the software component and add it to rule engine 320 (updating rules), the outcomes controlled by the ML model may also include determining whether or not to (ii) automatically generate and apply a code patch to the software component (generating a patch), (iii) automatically generate and transmit an alert message (generating an alert), (iv) automatically record the use configuration of the software component for further review (recording a bug), (v) perform some other automated action. In one embodiment, the machine learning model is trained to produce an output vector of decisions to take or not to take one or more of a set of automated actions. The outcomes are thus approval decisions linked to automated actions.

Thus, in one embodiment, the ML model is trained to choose one or more actions to be performed from among the plurality of automated actions. The choice is based at least in part on the implemented parameters and a user input to confirm (or reject) the choice by the machine learning model of the automated action. For example, the ML model may monitor a user's response to approve proceeding with a chosen automated action (such as those described above) for a given set of implemented parameters where the ML had determined not to proceed. Or, the ML model may monitor a user's response to reject proceeding with a chosen automated action for the given set of implemented parameters where the ML had determined to proceed. Then, the ML model will adapt or (re) train to choose the action (e.g., to proceed or not) consistently with the user's response, given the implemented parameters. In one embodiment, the automatic determination to proceed with an automated action by a trained machine learning model (as discussed below at block 240) includes choosing the automated action by the trained machine learning model. The choosing of the automated action selects the automated action from among a group or plurality of available actions.

For example, the selection may be made by activation of a perform/do not perform the automated action output of the trained machine learning model.

In one embodiment, the ML model is a neural network. Although adaptive code scanning method 200 is described herein with reference to the ML model being a neural network, in some embodiments, other types of ML models for classification (such as random forest and k-nearest neighbors models) may also be used to control activation of the automated actions.

In one embodiment, during training the neural network accepts as inputs feature vectors that include parameter values of how the software component is prescribed to be used according to the rules. Outcome determinations for the plurality of automated actions are also provided as inputs. The values for the parameters in the feature vector are provided to neurons in an input layer of the neural network. In a neuron values are multiplied by weights, and added together with a bias value. The resulting value is provided to an activation function of the neuron. The activation function generates an activation value indicating an extent to which the neuron is activated. The activation values for the neurons in the first layer are passed to neurons of a subsequent layer, for which weighting, summing with bias, and activation operations are also performed. The neural network may include one or more such intermediate layers before reaching an output layer of perform/do not perform decisions for the various automated actions.

The model is trained using an optimization algorithm to adjust is parameters and minimize classification error. In one embodiment, during training, the feature vectors for a given component that are labeled as to expected outcomes are split into a training set and a testing set of the feature vectors. During training, the model is fit to the training set of feature vectors. The output decisions at the output layer of the neural network are compared with the expected outcomes. Where the output decisions and expected outcomes differ, the weights and/or biases of the neurons in the neural network are adjusted using a backpropagation algorithm. In one embodiment, the backpropagation algorithm changes weights and/or biases by gradient descent. The adjustment to weights and/or biases is adjusted until the output decisions and expected outcomes differ only by a threshold amount. For example, an accuracy threshold of between 0% and 5% inaccuracy, such as 1%, may be selected. Once the model is sufficiently accurate, outputs of the neural network are evaluated with the testing data that was not used in training the model to confirm the accuracy of the model.

Following training, for subsequent unapproved uses of a component, in one embodiment the ML model will follow established patterns of action activation that were captured by the training. In one embodiment, the adaptive code scanning method 200 may request a clarification input through a user interface if one or more of the actions are not selected strongly enough by the ML model. In one embodiment, datasets of use configurations with new scenarios (or rules) and patterns (of parameters) are iteratively collected as the use configurations are detected in the codebase. The datasets with new scenarios and patterns are then used to retrain the ML model and evaluate its performance and classification accuracy.

In one embodiment, adaptive code scanning method 200 gathers a training set and a test set of feature vectors that are labeled with expected outcomes. For example, the training and test sets of feature vectors may be extracted from rules in rule engine 320 at least in part by (i) extracting the values of the parameters of a rule and including the values in a feature vector for the rule and (ii) inferring from the presence of the rule in rule engine 320 that the expected outcome for an "update rules" action for the configuration is to find the configuration to be valid and included in the rules. The ML model is trained to determine whether to proceed with one or more automated actions (such as updating the rules) with the training set. The resulting trained ML model 145 is then tested for accurate approvals of the automated actions using the test set. The tested, trained ML model 145 may then be incrementally retrained based on new use configurations that are found in the codebase. In this way, adaptive code scanning method 200 may train the machine learning model to decide to proceed with one or more automated actions, based at least in part on the approved parameters of use in rule engine 320.

Process block 215 then completes, and adaptive code scanning method 200 proceeds to process block 220. In one embodiment, the functions of process block 215 are performed by ML model trainer 110 of adaptive code scanning system. Additional detail regarding training of the ML model is discussed below, for example with reference to AI/ML 330 of FIG. 3 and example AI/ML model training process 500 of FIG. 5.

—Example Code Scanning Method—Component Detection Scan—

At process block 220, adaptive code scanning method 200 scans software code to detect that the software component exists in the software code. In one embodiment, adaptive code scanning method performs a code analysis to locate where the software component is used in a body of software code. For example, adaptive code scanning method 200 parses through the body of software code to find instances of the software component. In one embodiment, adaptive code scanning method 200 can locate an instance of the software component in software code by recognizing a signature tag for the software component in the software code. In one embodiment, adaptive code scanning method can locate an instance of the software component by evaluating the body of code using regular expressions to find segments of the body of code that match a pattern of the software component.

In one embodiment, the software code is a body or collection of software code statements that were implemented, written, arranged, or otherwise composed by one or more users, such as in a codebase. The software code may include one or more software applications, functions, classes modules, or other discrete portions, subdivisions, or units of code. The software code or codebase may include contributions written by one or more users, as well as user-configured implementations of one or more reusable software components.

At a high level, adaptive code scanning method 200 scans the software code to determine whether a software component is being used as prescribed. As a threshold step to examining the use of a software component, adaptive code scanning method 200 initially searches the software code to discover where the software component is being used. Portions of the software code surrounding instances where the software component is being used may then be examined in further detail to determine whether the use configuration is valid (as discussed below at process block 225). By filtering out portions of the software code that do not include the software component, portions of the code that are irrelevant in validity analysis are removed from the more processor-intensive validity scanning. In this way, the technology of code scanning is thus improved by reducing compute resource requirements for code scanning.

In general, a software component includes a signature tag that uniquely identifies the software component with respect to other software components. In one embodiment, the signature tag is assigned to the software component by the developer of the software component. In one embodiment, when the software component is added to a library of reusable software components for a codebase, a signature tag that is distinct from other signature tags assigned to other software components is automatically assigned to the software component, thereby ensuring that the signature tag is unique.

In one embodiment, adaptive code scanning method 200 detects whether the software component exists—that is, is present—in the software code by searching for the signature tag for the software component. For example, adaptive code scanning method 200 parses the software code, analyzing the symbols in the software code to distinguish signature tags from the rest of the code. Adaptive code scanning method 200 then compares the signature tags found in the code to the signature tag for the software component. Where a match is found, adaptive code scanning method 200 has detected an instance of the software component. In response to detecting an instance of the software component, adaptive code scanning method 200 records the location of the instance within the software code, for example by recording file name and a line number of the code at which the signature tag is located. The locations may be recorded for subsequent processing in a list (or other data structure) of component detections.

In one example, adaptive code scanning method 200 searches for instances of a video player component in a body of software code for a user interface. Adaptive code scanning method 200 finds segments of the software code that use the video player component. The video player component has a unique identifier (signature tag) and is identifiable by that. If the signature tag for the video player component is found in some portion of the software code (such as an HTML page), then the HTML page uses the video component, and the HTML page and location of the signature tag within the is written to a list of detections of the video player component.

In one embodiment, adaptive code scanning method 200 accesses or retrieves software code that has been designated for scanning. Adaptive code scanning method 200 parses the software code to pick out signature tags. Adaptive code scanning method 200 compares the signature tags found in the software code with a reference signature tag for the software component. In response to finding a match between a signature tag detected in the software code and the reference signature tag for the software component, adaptive code scanning method 200 writes the location of the match to a list of detected instances of the software component, thus producing a record of the detections 155. In this way, adaptive code scanning method 200 may scan software code to detect that the software component exists in the software code.

Process block 220 then completes, and adaptive code scanning method 200 proceeds to process block 225. In one embodiment, the functions of process block 220 are performed by component scanner 115 of adaptive code scanning system 100. Additional detail regarding scanning software code to detect an instance of the software component is discussed below, for example with reference to adaptive scan 315 of FIG. 3.

—Example Code Scanning Method-Parameter Identification Scan—

At process block 225, in response to detection of the software component, adaptive code scanning method 200 scans the software code to identify implemented parameters of use for the software component. In one embodiment, adaptive code scanning method performs a further code analysis to extract a configuration for a detected instance of the software component from portions of the body of software code that are associated with the instance. For example, adaptive code scanning method 200 the ways how users are using the software components in the codebase. In one embodiment, adaptive code scanning method 200 scans locations in the code where an instance of the software component is detected in order to find properties of the way that the instance of the software component is implemented. From these properties, adaptive code scanning method 200 can determine whether the implemented way that the software component is being used is actually an approved way or not according to the valid configurations (as discussed below at process block 230).

In one embodiment, adaptive code scanning method 200 scans the software code to identify implemented parameters of use automatically when the software component has been detected. The parameter identification scan is performed on the software code at or around the locations where the software component is detected. For example, adaptive code scanning method 200 may proceed through the list of detections and identify parameters of use from portions of the code that surround or interact with locations of the individual instances of the software component that were detected.

In one embodiment, the parameters of use are variables that are used to determine whether or not a use of a software component is valid. For example, the parameters of use may be the variables of one or more logical rules associated with the software component (for example, rules in rule engine 320). In one embodiment, adaptive code scanning method 200 parses one or more logical rules to determine a set of variables used by the rules. The variety of parameters of use is thus broad, and may encompass the types of information available from the implemented software code that are used in rules. For example, the parameters of use may include information about inputs to and/or outputs from the software component, such as file type of input or output, source of input, destination of output, etc. And for example, the parameters of use may include location of the software component within some portion of the software code, such as relationship of the software component to parent, child, and sibling portions of the software code.

In one embodiment, adaptive code scanning method 200 parses software code that is associated with an instance of the software component to extract, derive, or otherwise generate values for the parameters of usage (that is, for the variables used in the rules) for the software component. Adaptive code scanning method 200 can obtain values for parameters from the software code in a variety of ways. For example, to identify parameter values for the usage of the instance of the software component, adaptive code scanning method 200 may: (i) check calls or invocations of the software component to determine what values, and what data types are passed to the software component; (ii) check outputs or returned values to determine what values and data types are produced by operation of the software component; (iii) inspect other software components in the body of software code that use or manipulate the inputs and outputs of the software component; (iv) identify dependencies of the software component, or other components that are dependent on the software component; (v) perform natural language processing of comments within the software code; or (vi) determine the position of the instance of the software component in a hierarchy of the software code, for example by identifying one or more of parent, child, or sibling relationships with other source code portions.

In one embodiment, software code that is associated with the instance of the software component is evaluated using regular expressions to find values associated with patterns for the parameters of usage. Or, in one embodiment, software code that is associated with the instance of the software component is evaluated using an ML natural language processing model that is trained to identify the values for the parameters of usage to find values associated with patterns for the parameters of usage. Thus, adaptive code scanning method 200 looks for properties in the software code configuration that provide values for the parameters of use.

In one example, adaptive code scanning method 200 determines usage parameters for an instance of a video player component in a body of software code for an HTML user interface. Adaptive code scanning method 200 may identify parameters such as (i) that the instance of the video player component is accepting an MP3 file as an input and (ii) that the instance of the video player component is positioned within a body portion of an HTML page. Thus, the "input" and "placement" are two configuration parameters that are defined in the behavior configuration of the video player component. These parameters are determined from the software code in the HTML page.

In one embodiment, adaptive code scanning method 200 accesses or retrieves (i) the software code that has been designated for scanning and (ii) the list of detected instances of the software component. Adaptive code scanning method 200 then identifies parameters of use from the variables of logical rules that describe valid uses of the software component. Adaptive code scanning method 200 then parses portions of the software code that surround or interact with the instances of the software component in the list of detected instances to determine values for the parameters of use for the listed instances. The values for the parameters are recorded in association with the respective instances of the software component to which the parameter values apply. This generates the parameters for the instances of the software component as implemented (or implemented parameters 160). In this way, adaptive code scanning method 200 may scan the software code to identify implemented parameters of use for the software component.

Process block 225 then completes, and adaptive code scanning method 200 proceeds to process block 230. In one embodiment, the functions of process block 225 are performed by parameter scanner 120 of adaptive code scanning system 100. Additional detail regarding scanning software code to identify the parameters of use as an instance of the software component is implemented is provided below, for example with reference to adaptive scan 315 of FIG. 3.

—Example Code Scanning Method-Parameter Comparison—

At process block 230, adaptive code scanning method 200 compares the implemented parameters of use to the approved parameters of use. For example, the implemented parameters of use for the software component are evaluated by the rules for valid configurations (that were defined in rule engine 320 at process block 210 above). Adaptive code scanning method 200 will check whether the configurations of the instances of the software component in the software code are valid configurations.

In one embodiment, adaptive code scanning method 200 accesses or retrieves (i) approved parameters 140 for the software component (for example as logical rules for valid configurations for the software component from rule engine 320), as well as (ii) implemented parameters 160 for the instances of the software component in the list of detected instances. In one embodiment, adaptive code scanning method 200 plugs in the implemented parameters for an instance of the software into a rule for a valid configuration of the software component, and executes or evaluates the rule. In one embodiment, where the rule evaluates to TRUE, then the implemented parameters of use are a valid configuration under the rule. And, where the rule evaluates to FALSE, then the implemented parameters of use are an invalid, non-approved configuration under the rule.

The evaluation results of TRUE or FALSE for applying the rules to the implemented parameters of the software component are recorded in association with the software component. For example, the results may be stored in a matrix or table data structure that is indexed by rule applied on one axis, and by instance of software component on another axis. In this way, adaptive code scanning method 200 may compare the implemented parameters of use to the approved parameters of use. Process block 230 then completes, and adaptive code scanning method 200 proceeds to process block 235.

At process block 235, based on the comparison, adaptive code scanning method 200 determines that the software component is not used in the software code as designed. In other words, the adaptive code scanning method 200 determines that the software component is not implemented in the software code according to the valid configurations. Where no rule describing a valid configuration of the software component is true for an instance of the software component, the instance of the software component is used in the software code in an invalid manner that is not as designed. That is, the instance of the software component is configured in a manner that is not consistent with the valid configurations that are pre-approved for the software component.

Note that there may be a plurality of rules that describe differing approved parameters of use for a software component. Where any one of the rules for the software component evaluates to TRUE for implemented parameters of use for an instance of the software component, the instance is used in an approved way (valid configuration). Where none of the rules for the software component evaluates to TRUE (all rules for the software component evaluate to FALSE) for implemented parameters of use for an instance of the software component, the instance is used in a non-approved way (invalid configuration).

The determination as to whether the configuration of the parameters of use for a given instance is valid or invalid is recorded in association with the given instance. This process may be repeated in a loop for more than one instance of the software component in the list of detected instances. This produces a collection of determinations 160 as to whether or not an instance of the software code is implemented according to valid configurations 106. In other words, a group of decisions is generated as to whether or not an instance of the software code is used as designed or approved. Process block 235 then completes, and adaptive code scanning method 200 proceeds to process block 240.

In one embodiment, the functions of process blocks 230 and 235 are performed by parameter comparer 125 of adaptive code scanning system 100. Additional detail regarding determining that the software component is not used as designed (i.e., implemented according to a valid configuration) in the software code based on a difference between the implemented parameters of use and the approved parameters of use is discussed below, for example with reference to adaptive scan 315 of FIG. 3.

—Example Code Scanning Method—ML Action Selection—

At process block 240, in response to the determination that the software component is not implemented according to the valid configuration (used as designed), adaptive code scanning method 200 automatically determines by the trained machine learning model to proceed with the automated action. The determination by the ML model is based at least in part on the implemented parameters of use. For example, the implemented parameters of use for an invalid configuration are evaluated by the ML model to determine what to do about the invalid configuration. In one embodiment, the implemented parameters of use for an instance of the software component are written into a feature vector. The feature vector is provided as input to the ML model, and the ML model generates estimated outcomes for one or more automated actions.

The ML model uses an estimated outcome to automatically decide whether an automated action should be performed. In one embodiment, an output of the ML model is configured to trigger an automated action. In one embodiment, the ML model has multiple outputs. Each output is associated with and controls activation of a distinct action. For example, where the ML model is a neural network, activation of a neuron in an output layer of the neural network causes an action associated with the neuron to commence and proceed.

In one embodiment, the automated actions include (i) adding a new rule to rules engine 320 that approves the invalid configuration of the software component that was input to the ML model; (ii) modifying the code of the software component with portions of user-implemented code; (iii) generating and transmitting an alert about the invalid configuration; (iv) logging the invalid configuration in a tracking system for subsequent manual attention; or other automated actions (as discussed below with reference to AI/ML 330, and under the headings "Example Autonomous Code Changes", "Other Autonomous Actions"). Each of these automated actions may be carried out automatically after activation by outputs of the ML model. In one embodiment, each of these automated actions may be considered a class or category into which the trained ML model may classify a configuration of an instance of a software component, based on the provided inputs (e.g., parameters of use, trend information, etc.).

In one embodiment, the adaptive code scanning method 200 accesses or retrieves (i) the trained ML model, and (ii) the recorded values for the implemented parameters of use associated with the instances of the software component. Adaptive code scanning method 200 places the values for the parameters into a feature vector. The adaptive code scanning method 200 provides the feature vector to the trained ML model for analysis. Adaptive code scanning method 200 executes the trained ML model on the feature vector to determine which, if any, automated actions 170 should be activated given the values for the implemented parameters. For example, where the trained ML model is a neural network, the output layer produces activation decisions based on the parameters of use (or other parameters included in the feature vector, such as trend information). The output activation decisions made by the ML model are stored, for example, in memory for subsequent control of automated actions 170. In this way, adaptive code scanning method 200 automatically determines by the trained machine learning model to proceed with the automated action based on implemented parameters of use.

Process block 240 then completes, and adaptive code scanning method 200 proceeds to process block 245. In one embodiment, the functions of process block 240 are performed by action selector 130 of adaptive code scanning system 100. Additional detail regarding ML analysis to select an automated action is provided below, with reference to AI/ML 330 of FIG. 3 and AI/ML model runtime 600 of FIG. 6.

—Example Code Scanning Method-Automated Action Performance—

At process block 245, adaptive code scanning method 200 performs the automated action to adapt to the implemented parameters of use for the software component. As used herein, the term "adapt" refers to modification, adjustment, update, or generation of some aspect of adaptive codescan system 100 (such as rule engine 105, 320, machine learning model 145, 330, codebase or body of software code 150, or electronic alert 180) in response to how software components are actually implemented, configured, or otherwise used in codebase or body of software code 150. In one embodiment, the adaptive code scanning method 200 performs the automated action to adapt the approved parameters of use (in one or more valid configurations) for the software component based on the implemented parameters of use.

In one embodiment, the outputs of the trained ML model (e.g., the output layer of a trained neural network) represent activation decisions for various automated actions. The automated actions are processes for handling instances of a software component that are downstream of detection and characterization as invalid. The automated actions are selected to be applied, or not, to the instance of the software component by the outputs of the ML model. In other words, the trained ML model performs a gating function at the beginning of the various downstream processes that is controlled (at least in part) by the implemented parameters of use that are input to the ML model. An output of the ML model will open a gate to permit an automated action to proceed for a particular configuration of the software component in response to a first set of implemented parameters of use input to the ML model. Or, the output of the ML model will close the gate to prevent the automated action from proceeding in response to a second set of implemented parameters of use input to the ML model. For example, where an output neuron is activated for an instance of the software component, the automated action associated with the output neuron will commence for the instance of the software component.

In one example, one output (e.g., an "update rules" neuron) may control whether or not the adaptive code scanning method should proceed to add the implemented parameters of use for the software component as an approved or valid configuration. Adding the implemented parameters of use as a valid configuration (for example, by adding a new rule to or modifying an existing rule in rule engine 320) is one way to adapt to the implemented parameters of use for the software component. The automated process for converting the parameters of use into a new rule for the software component and adding the new rule to rule engine 320 is configured to (i) commence where the implemented parameters of use for the software component cause the trained ML model to activate the update rules neuron, and (ii) not commence where the implemented parameters of use for the software component cause the trained ML model not to activate the update rules neuron. Similar ML output-based control may be applied to other downstream, autonomous actions, such as automatically modifying or patching code (controlled by a "generate patch" neuron, as discussed below under the headings "Example Autonomous Code Changes" and "Other Autonomous Actions".

In one embodiment, actions described herein as being performed automatically or autonomously may be subject to presentation on a computing device associated with an administrator or other user for confirmation. Upon receiving an input from the user that confirms the action, adaptive code scanning method 200 will proceed to carry out or complete the action automatically.

In one embodiment, adaptive code scanning method 200 accesses or retrieves a status of activation or non-activation for an output of the trained ML model. (The activation/non-activation status of the output is generated by the trained ML model from inputs of the parameters of use for the instance of the software component as implemented in the codebase) Adaptive code scanning method 200 then controls the commencement of an autonomous action regarding the instance of the software component. The autonomous action is permitted to proceed where the output is activated. The autonomous action is not permitted to proceed where the output is not activated. Where the autonomous action is permitted to proceed, the autonomous action executes. In one embodiment, at or prior to completion of the autonomous action, adaptive code scanning method 200 request input of confirmation of the action from a computing device associated with a user or administrator. In this way, adaptive code scanning method 200 may automatically perform actions while still obtaining user or administrator confirmation that the action is appropriate.

Process block 245 then completes, and adaptive code scanning method 200 concludes at end block 250. In one embodiment, the functions of process block 245 are performed by action implementer 135 of adaptive code scanning system 100. In one embodiment, adaptive code scanning method 200 continues in a repeating loop for one or more additional software components. In one embodiment, once the additional software components are scanned for, the loop terminates, and results of the scan may be presented in a GUI, such as trend report 400 as shown and described with reference to FIG. 4.

—Further Details of Example Adaptive Code Scanning Method—

In one embodiment, adaptive code scanning method may include training a machine learning model to decide whether (or not) to proceed with the automated action (for example as discussed in process block 215). The training is based at least in part on the approved parameters of use. The automatic determination to proceed with the automated action based on the implemented parameters of use (for example as discussed in process block 240) is then made by the trained machine learning model. In one embodiment, adaptive code scanning method 200 may include retraining or supplemental training of the machine learning model to adapt to and approve previously unapproved uses that are implemented in the body of code. In one embodiment, adaptive code scanning method 200 further includes training the machine learning model based at least in part on (i) the implemented parameters and (ii) a user input to select one of the plurality of actions. In one embodiment, adaptive code scanning method 200 further includes training the machine learning model based at least in part on the (i) implemented parameters and a user input to confirm the choice by the machine learning model of the action. The training of the machine learning model is performed automatically in response to the determination that the software component is not implemented (or used) in the software code according to the valid configuration (as designed or approved), for example as discussed above at process block 235.

In one embodiment, adaptive code scanning method 200 further includes steps for using the machine learning model to select or choose one or more automated actions to perform from among a plurality of available automated actions. The selection is based at least in part on the implemented parameters of use for the software component. The selection is also based at least in part and based at least in part on training to perform the selected action under the implemented parameters due to user confirmation of a prior selection of the selected action under parameters of use similar to the implemented parameters. In one embodiment, adaptive code scanning method 200 trains the machine learning model to choose the automated action to be performed from among a plurality of actions. The choice is based at least in part on the implemented parameters and a user input to confirm the choice by the machine learning model of the automated action. Then, the automatic determination to proceed with the automated action (of process block 240) includes choosing the automated action by the trained machine learning model. For example, the choice of an automated action may be made by activation of one neuron (or other output of the ML model) that controls proceeding with the automated action among other neurons that control proceeding with other automated actions.

In one embodiment, adaptive code scanning method 200 further includes steps for automatically adopting an unapproved use of a software component that is trending towards increased use, provided the unapproved use is sufficiently similar to already approved uses. Adaptive code scanning method 200 determines that there is a trend of implementing (or using) the software component in a particular way that is not according to the valid configuration(s) (i.e., not as designed). In other words, the adaptive code scanner detects that a given way of using the code that, while not as designed or pre-approved, is increasingly implemented in the software code. The trend is determined or detected in the body of code based on a similarity of implemented parameters of use in a plurality of instances of the software component. Adaptive code scanning method 200 then determines that the trend satisfies a threshold for performing the automated action. The automated action is performed automatically in response to satisfaction of the threshold. In one embodiment, the trend is a value indicating a change (increase or decrease) in usage in the unapproved way since a previous point in time, such as a prior release of the software component. Where the trend of use in the unapproved way satisfies a threshold, such as an increase of at least 20% or more, then adaptive code scanning method 200 may automatically approve the non-approved configuration as valid. Threshold values described herein may vary subject to user preference.

In one embodiment, adaptive code scanning method 200 further includes steps for automatically adopting an unapproved use of a software component that is being implemented by multiple users, provided the unapproved use is sufficiently similar to already approved uses. Adaptive code scanning method 200 determines that multiple users are implementing (using) the software component in a particular way that is not according to the valid configuration (not as designed) based on a similarity of implemented parameters of use in a plurality of instances of the software component. The instance of the software component are implemented in the codebase by more than one user. Adaptive code scanning method 200 then determines that the plurality of instances satisfies a threshold for performing the automated action. The action is performed automatically in response to satisfaction of the threshold. In one embodiment, the threshold is a number or proportion of users that implement the software component in the particular, non-approved way. For example, where half or more of the users implement the software component in the particular non-approved configuration, then adaptive code scanning method 200 may automatically approve the non-approved configuration as valid.

In one embodiment, a newly-approved valid configuration may then be added to definitions of valid configurations, for example by writing the implemented parameters of use into a rule engine such as rule engine 320. In one embodiment, performing the automated action (discussed above at process block 245) includes defining the new configuration as valid. For example, adaptive code scanning method 200 may automatically define an additional valid configuration for the software component in a manner similar to that discussed above at process block 210. The definition of the additional valid configuration may be based, at least in part, on the implemented parameters of use for the software component that were previously not approved.

Or, in one embodiment, a configuration that is not valid may be due to additional features being implemented by users to extend the functionality of the software component. In one embodiment, performing the automated action (discussed above at process block 245) includes modifying the software component. For example, adaptive code scanning method 200 may automatically modify the software component based on the implemented parameters of use. In one embodiment, user-composed code that interacts with the implemented software component may be copied, in whole or in part, and added to an updated or alternative version of the software component. The modifications to the software component may be based, at least in part, on the implemented parameters of use that were not approved.

In one embodiment, performing the automated action (as discussed in process block 245) includes steps for automatically informing users about improper use configuration for software components. For example, adaptive code scanning method 200 may generate or compose an electronic alert that indicates that the software component is not used in the software code as designed. The alert may indicate that the software component is not implemented in the software code consistently with or according to the valid configurations that are pre-approved in the rule engine. The electronic alert includes information describing the approved parameters of use for the software component, for example to educate the recipient of the alert about proper or approved use of the software component. The electronic alert may also include information describing parameters of use as implemented for a particular instance of the software component, for example to indicate to the recipient the reason(s) that the use of the particular instance is not approved. Once the electronic alert has been generated, adaptive code scanning method 200 may then transmit the electronic alert to a user interface for a user associated with the software component. Additional detail regarding electronic alerts is described herein under the heading "Electronic Alerts".

In one embodiment, the parameters of use that are approved describe aspects of the relationship between the software component and the software code. For example, the approved parameters may describe a position of the software component within the software code. And, for example, the approved parameters may describe an input or an output of the software component. In one embodiment, the descriptions are made in the approved parameters of use, for example as stored in rule engine 320. In one embodiment, the approved parameters of use provide the description using specified values or ranges of values for the parameters expressed in a logical rule. The logical rule may be evaluated to be true or false to indicate whether a given use configuration is approved and valid, or non-approved and invalid.

In one embodiment, performing the automated action (as discussed in process block 245) includes prioritizing revisions to the software component based on how often the software component is misused in a given way. Thus, in one embodiment, when performing the automated action adaptive code scanning method 200 records the implemented parameters of use for the software component in a log or other data structure. Then, adaptive code scanning method 200 generates a priority for revision of the software component to accommodate the implemented parameters. The priority is generated based at least in part on a quantity of uses of the software component with the implemented parameters.

In one embodiment, adaptive code scanning method 200 defines a behavior configuration (such as a valid configuration) for a software component. The definition includes behavior parameters of use. Then, adaptive code scanning method 200 scans software code to identify whether the software component exists in the software code. If so, adaptive code scanning method 200 scans the software code that functions with the software component to identify implemented parameters (user implementation configuration) based on the behavior configuration. Adaptive code scanning method 200 compares the implemented parameters to the behavior parameters from the behavior configuration. Based on the comparing, adaptive code scanning method 200 determines whether the software component is being used in the software code as designed or not as designed. In other words, whether the software component is implemented according to the valid configurations is determined based on the results of the comparison of the implemented parameters and the approved parameters. If the software component is not used or implemented according to the valid configurations, in one embodiment, adaptive code scanning method 200 generates an alert message of not being used as designed. Also, if the software component is not used or implemented according to the valid configurations, in another embodiment, adaptive code scanning method 200 fixes the code to be like or similar to code as implemented or used by most people. That is, adaptive code scanning method 200 modifies code based on the user implementation configuration. And, where the software component is not used or implemented according to the valid configurations, in a further embodiment, adaptive code scanning method 200 generates a code modification for the software component based on the implemented parameters from the software code.

Additional Embodiments and Discussion

In one embodiment, the adaptive codescan systems and methods improve the technology of code scanning by taking a scanning report that the adaptive codescan has generated and feeding information from the report back into an AI/ML engine to update the understanding of what code uses are permitted. This readies the adaptive codescan systems and methods to catch and assess new violations for new components and new usages of the software components of a code library. Thus, in one embodiment, the adaptive codescan systems and methods automatically improves code quality using artificial intelligence and machine learning that draws on identified trends and generated analytics. For example, the adaptive codescan systems and methods may draw usage patterns from, and automatically improve, massive codebases spread across multiple repositories. In one embodiment, adaptive codescan systems and methods may automatically perform design time and runtime upgrades to software components. In various embodiments, adaptive codescan systems and methods provide enhanced visibility of the actual uses of software components within a codebase, providing insights and identifying usage trends. Automated actions from the adaptive codescan systems and methods can also be used to enforce uptake standards for using software components by alerting and/or education for users in response to improper uses of software components.

In one embodiment, adaptive code scanning may serve a variety of purposes. One purpose is improving trust in the codebase by enforcing consistency of usage in the codebase. In one embodiment, adaptive code scanning method 200 provides visibility of the consistency of usage by generating alert messages or health reports that are sent to programming or development teams.

Another purpose that may be served is adaptation of the code scanner and software components to the way software components are being used in a codebase. In one embodiment, the software component is built with intended (pre-approved) uses in mind. If the component is not actually used consistently with the intended use, adaptive code scanning method 200 may expand the definitions of to cover actual uses of the software component and/or revise or optimize the code of the software component based on the actual uses of the software component. In one embodiment, where a software component is actually used by many users in a way that is different from ways that are approved (e.g., where a different input parameter is being used, such as MP3 for video player component), then an adaptation consistent with the actual usage may be automatically implemented by adaptive code scanning method 200. For example, adaptive code scanning method 200 may automatically generate a code patch to modify or fix the software component to adapt to the actual usage of the software component. For instance, adaptive code scanning method 200 may automatically generate a changed input parameter in the code of the software component to MP3, provide the changes as code fix/update/patch, and release the patch. Or, for example, adaptive code scanning method 200 may automatically update the approved configurations for the software component to adapt to the actual usage of the software component.

Another purpose that may be served is automatically initiating manual investigation to determine how and why users are not using the component as intended. Where a non-approved use seems valid, but was not amenable to automated code modification or adjustment of the rules to adapt to the non-approved use, adaptive code scanning method 200 automatically launches a partially manual process to reprogram, redesign, or otherwise fix the code of the software component in the way the users are using it.

Still another purpose that may be served by the adaptive code scanning method 200 is automated instruction to users on proper usage of specific software components. If the system chooses not to fix code or adjust rules because analysis or investigation determines that users are using the component incorrectly, in a manner that is not appropriate to include in a range of valid configurations for the software component, the adaptive code scanning method 200 may generate and send targeted instructional messages or alerts to the users who misuse the software component. The message content may reeducate users on how to properly use a software component.

A further purpose that may be served by adaptive code scanning method is identification of enhancements. The list of unapproved uses detected in the code base is useful to prioritize enhancements to future releases. In one embodiment, adaptive code scanning method 200 shows which components are most often misused, allowing developers to focus their efforts on highly used components.

—Example Architecture for Adaptive Code Scanning—

FIG. 3 illustrates one embodiment of an example architecture 300 for adaptive code scanning associated with detection of and adaptation to unapproved uses of software components in a body of software code. Example architecture 300 includes an adaptive code scanning tool 305 configured to detect unapproved uses of software components a codebase 310 or other collection of software code and adapt to the unapproved uses. In one embodiment, adaptive code scanning tool 305 includes adaptive scan 315, rule engine 320, trend report 325), and AI/ML 330 components.

In one embodiment, codebase 310 is a mass or body of software code used to build a particular software application or program or group of applications or programs. Codebase 310 may include libraries of code for one or more independent applications. The libraries of code may include instances of reusable software components, as well as user-created custom code. In one embodiment, codebase 310 spans code created by one or more groups of users. The codebase may include thousands of individual components, both reusable software components and custom-created components. For example, the code in the codebase might be display or user interface code, application code, program code, or other forms of software code.

Adaptive code scanning tool 305 monitors the uses of reusable software components in codebase 310 for compliance with rules described in rule engine 320. And, adaptive code scanning tool 305 modifies the rules described in rule engine 320 based on (i) actual user implementations in codebase 310 that are detected by adaptive scan 315 to be non-compliant, unallowed, or invalid uses and/or (ii) trend analyses by trend report 325 of the detected non-compliant, unallowed, or invalid uses.

In one embodiment, adaptive scan 315 performs code scans of the codebase 310. Adaptive scan checks across the codebase 310 for uses of a reusable software component, and then analyzes whether the software component is being used correctly or incorrectly. During a code scan, active scan 315 operates to detect the presence of reusable software components in codebase 310. For example, active scan 315 examines the codebase 310 for for one or more reusable software components from a code library.

In one embodiment, as the basis for detection, adaptive scan 315 accesses a list of identifiers (e.g., tags such as an HTML element tag) contained in the code of (or otherwise associated with) the reusable software components. For example, the identifiers may provide a signature for a component that is uniquely associated with the component, and appears only in instances of the component. These tags may be assigned to the reusable software components by the user or code library system. Adaptive scan 315 then searches the codebase 310 for the identifiers to detect instances of reusable software components. In one embodiment, adaptive scan 315 identifies whether or not a software component exists within any given portion of code in the codebase 310 based on whether the identifier is present. In one embodiment, pattern matching between code in the codebase 310 and a reference copy of the reusable software component may be employed to detect the reusable software component, as an alternative to or confirmation of detection based on the identifier.

Where an instance of a reusable software component is found in the codebase 310, adaptive scan 315 detects parameters of use that indicate the way that the detected instance of the reusable software component is being used the codebase 310. The parameters of use are gathered from features and context surrounding the instance of the reusable software component in codebase 310. Adaptive scan 315 then determines whether the parameters of use for the reusable software components as implanted in the codebase 310 are consistent with one or more allowed parameters of use for the reusable software components. As the basis for the determination, adaptive scan 315 retrieves rules applicable to a reusable software component from rule engine 320. Adaptive scan 315 examines a use of the software component as implemented in codebase 310 to extract the parameters used by the rules, and then evaluates whether or not the rules are satisfied to determine whether or not the use of the software component is approved.

In one embodiment, rule engine 320 is used by adaptive scan 315 to examine code from the codebase 310. In one embodiment, the rules in rule engine 320 configure adaptive scanner 315 to identify (i) the software components that adaptive scanner 315 is to detect and/or (ii) the parameters that are relevant to determining whether a configuration of the software component is approved. In one embodiment, adaptive scan 315 uses rules from a rule engine 320 to determine whether a use of a software component is or is not an approved use. In one embodiment, approved uses for a software component are described by rules in the rule engine 320. A reusable software component may have one or more approved configurations of parameters of use. The parameters of use are included as variables in rules of rule engine 320. The approved (or valid) parameters of use are described by rules in rule engine 320. In other words, the rules engine defines the configurations of what is correct behavior for a reusable software component.

The rules may be logical expressions involving one or more parameters of use for the reusable software component. For example, the rules may be considered to be "if" statements that are true when the logical expression evaluates as true. The rule engine thus contains a record (or other data structure(s)) of each particular reusable software component (for example by the identifier) in association with the approved or permitted configurations for the component. In one embodiment, the rule engine 320 describes the behavior configuration for each reusable software component, and the adaptive scanner scans the codebase 310 to confirm where and how often the component is being used in accordance with the behavior configuration.

In one embodiment, where a configuration of the parameters of use for a reusable software component match or satisfy a rule (i.e., the rule evaluates to true), then the configuration of the parameters of use is an approved configuration. And, where a configuration of parameters of use for the reusable software component do not match or satisfy the rules associated with the component, then the configuration of the parameters of used is in a non-approved configuration. In one embodiment, adaptive scan 315 may also identify and record a location (for example, a line number, a code page, a module, or other position within a body of code) where the instance of the reusable software component was found. The adaptive scan 315 may also transmit or otherwise output the location and the determination that the code was used in either an approved way or an unapproved way to trend report 325. Thus, in one embodiment, adaptive scan 315 updates trend report 325 as output.

In one embodiment, trend report 325 provides visibility of the various ways that reusable software components are being used in the codebase 310. And, in one embodiment, trend report 325 extracts and reports which uses are made in approved ways and which uses are made in non-approved ways. Unapproved uses in the codebase may span across multiple usages, multiple code libraries, and multiple teams of users. The approved and unapproved usages may be broken out by these various categories in trend report 325.

In one embodiment, trend report 325 may show various approved usages and unapproved usages. For example, the various approved usages and unapproved usages of components may be displayed or presented in a GUI. The usages may be shown in summary, for example in a chart or graph such as a bar chart. A trend of the usages indicating a change in amount of a particular usage configuration from a previous point in time may be extracted and included in trend report 325. The trend report 325 may be viewed to see whether, to what extent, and in which locations a reusable software component is being used or misused. In one embodiment, the trend report 325 generated as an output shows all the approved and unapproved instances of the components that are being scanned for. In one embodiment, trend report 325 may be presented in a GUI for example as shown and described with reference to FIG. 4 below.

The visibility into the use of the software components enables targeted education on how a software component is intended to be used. The visibility into the use of the software components also enables targeted expansion of approved uses and targeted modification to the software components themselves. In one embodiment, the education, expansion of rules for approved use configurations, and modification of software may each be automated using AI/ML 330.

Initially, in one embodiment, the rules describe a set of configurations for the reusable software component that are designated to be right or correct by an administrator of the codebase. In one embodiment, rule engine 320 thus starts with a baseline set of configurations that are manually configured. Then, adaptive code scanning tool 305 may automatically update or expand the rules in rules engine 320 over time using AI/ML 330, as discussed herein. Thus, in one embodiment, adaptive scan 315 actuates AI/ML 330 to modify rule engine 320 as output.

Referring again to the example above about the software component of a video player, the administrators have required that the video player be part of a base page. To make this determination, a rule from rule engine 320 includes markers (parameters) that adaptive scanner 315 should look for. For example, the rule might indicate parameters of a page that includes the video player such as: whether the page is a direct child of the body; whether there is a sibling element to the page in the body; and/or other HTML features indicating whether or not the page satisfies a definition of a base page. The parameters extracted from the page implemented in the codebase 310 are fed as input parameters to determine whether the video player is in an approved configuration of being in a base page.

In one embodiment, AI/ML 330 is configured to populate the rule engine 320 based on feedback from adaptive scan 315. The feedback includes parameter descriptions of unapproved usages. AI/ML 330 may adjust parameters in approved usage rules in rule engine 320. AI/ML 330 may add approved usage rules in rule engine 320. AI/ML may remove approved usage rules in rule engine 320. Based on this feedback to the rules engine, subsequent scans of codebase 310 will be more accurate. For example, the adaptive scan 315 will find more or fewer instances of approved usages in the codebase, based on the adjustment to more the definitions of approved usage parameters.

In one embodiment, AI/ML 330 may make smart (that is, ML-based) recommendations to implement the adjustments to, additions to, or removals of the approved usage rules in rule engine 320. AI/ML 330 assesses and determines how closely parameters of an unapproved use match up with approved uses. In other words, the AI/ML 330 determines whether an unapproved use of a software component is sufficiently congruent with previously approved uses to be adopted as new approved use.

In one embodiment, AI/ML 330 may automatically carry out the recommendations and modify the rule engine 320 in accordance with the recommendations. In one embodiment, AI/ML 330 may present the recommendations for user approval, for example by displaying them as user-selectable options in a GUI. In response to user input of a selection of the user-selectable option to approve a recommended modification in the rule engine 320, AI/ML 330 will automatically implement the recommendations and modify the rule engine 320 in accordance with the recommendations. In response to user input of a selection of an alternative user-selectable option to disapprove or decline the recommended modification, AI/ML 330 will not implement the recommendations. In one embodiment, the implementation of recommendations as described herein is performed by action implementer 135. In one embodiment, AI/ML 330 is trained to make the recommendations for example as shown and described with reference to FIG. 5 below. And, an example AI/ML 330 runtime operation for making the recommendations is shown and described with reference to FIG. 6 below.

Figure 4:
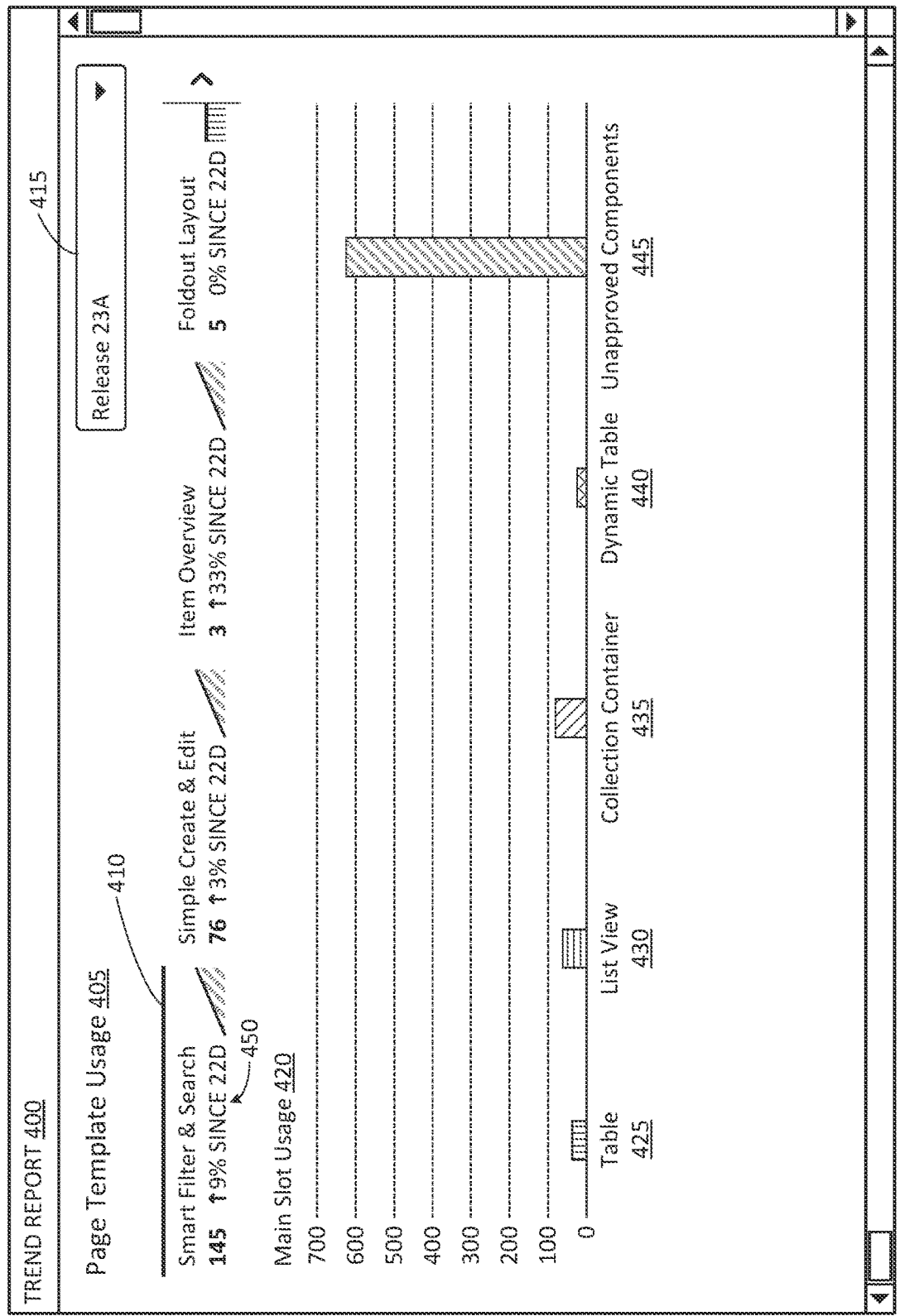
FIG. 4 illustrates one embodiment of an example trend report graphical user interface (GUI) for adaptive code scanning associated with detection of and adaptation to unapproved uses of software components in a body of software code.

FIG. 4 illustrates one embodiment of an example trend report GUI 400 for adaptive code scanning associated with detection of and adaptation to unapproved uses of software components in a body of software code. Example trend report GUI 400 shows a view of page template usage 405 for an example codebase for creating user interfaces, although codebases for other purposes may also be described in a trend report. Page template usage 405 shows usage of various reusable software components in body of code that is a template for generating an interface (e.g., HTML) page. The page template is a body of code that, when executed, provides a blank or container interface page including a header, subtitle, and "main slot" area for page content such as custom user-created content and/or reusable software components.

Page template usage 405 shows, at the level of individual interface pages, which reusable software components are being used in the interface pages. Smart filter & search 410, simple create and edit, item overview, and foldout layout are different page templates. In particular, page template usage 405 shows which reusable software components are used in smart filter & search 410 page templates in the example codebase for creating user interfaces. The highlight bar above smart filter & search 410 in trend report 400 indicates that usage information for the smart filter & search 410 page is currently shown. Other page templates for which software component usage may be shown include simple create and edit, item overview, and foldout layout components. These page templates may be selected through interaction with the user interface (e.g., by mouse click) to cause the page template usage to be updated to show usage of the selected components.

Page template usage 405 is displayed as of Release 23A of the example codebase, as indicated by dropdown menu 415. Dropdown menu 415 is a user-selectable element of the trend report 400 GUI. Page template usage 405 for a prior release may be displayed in trend report 400 in response to user selection of the prior release in dropdown menu 415.

Main slot usage 420 is a bar chart graphical element that shows results from a scan of the example codebase for creating user interfaces. Main slot usage 420 is a report of the usage of software components in main slots of smart filter and search 410 page templates. Main slot usage 420 shows counts of approved uses of table 425, list view 430, collection container 435, and dynamic table 440 reusable software components. The counts shown by the main slot usage 420 bar chart are the occurrences of approved uses of reusable software components 425, 430, 435, and 440 in the example codebase. Main slot usage 420 also shows a count of unapproved components 445. Unapproved components 445 are software components that are either reusable software components in unapproved configurations, or unrecognized components.

In one embodiment, trend report 400 outputs total or overall results for a codebase. For example, trend report 400 may show total numbers of software component instances that are approved and unapproved. Trend report 400 provides visibility into a codebase to allow an administrator or user to see where users are putting their own-user-composed content and reusable software components, and which reusable software components are being used properly. Based on the significant size difference between the occurrences of approved uses of reusable software components 425, 430, 435, and 440 in the example codebase and the occurrences of unapproved components 445, it is clear that the users overwhelmingly prefer to use unapproved parts.

Trend information for page templates is also generated and displayed in trend report 400. For example, the usage of the page templates is extracted by adaptive scan, and analyzed. The analysis may determine how often individual types of page templates are used, and how the count has changed since a previous point in time (such as a previous release). For example, the use of the smart filter and search 410 page template has increased 9% in an upward trend, as shown at reference 450.

Similar trend information may be generated for uses of individual software components. The trend information for individual software components may be viewed in trend report 400, for example, by clicking through the bar chart representations of reusable software components 425, 430, 435, and 440 and unapproved components 445 to drill down to the trend information of the components. For example, in response to a user interaction with the bar chart representations, such as a cursor hover or mouse click, the trend information about individual components will be displayed in for viewing in a pop up in trend report 400. Adaptive codescan system 100 may also include the information shown in trend report 400 in an alert or electronic message that is transmitted to electronic inboxes or other destinations associated with one or more users or administrators.

Trend information for types of software components (such as that viewable through drill-downs) may also be provided as an input to AI/ML decision-making about individual instances of type of software component. In one embodiment, one or more of the various trend values associated with a software component may be included in a feature vector for an instance of the software component. For example, an increase of over 50% of unapproved uses for dynamic table 440 since a previous release may be included in the feature vector along with the parameters of use for an instance of a dynamic table software component. AI/ML analysis of the parameters of use for one instance of a dynamic table will thus consider a trend associated with dynamic table software components when generating outcome decisions for the particular instance of the dynamic table. Trend values may thus be provided as inputs to AI/ML 330, and influence one or more of the outcomes.

In one embodiment, execution of the AI/ML 330 updating of the rule engine 320 will reduce the count of unapproved components 445 in subsequent scans. For example, a portion of the count of unapproved components 445 will be distributed among the table 425, list view 430, collection container 435, and dynamic table 440 software components due to automatic addition of approved configurations for these components in rule engine 420.

Or for example, a portion of the count of unapproved components 445 will be added to one or more newly-identified reusable software components. Where an unapproved component is used multiple times with similar usage parameters, in one embodiment, adaptive code scanning system 105 may autonomously identify the unapproved component as a potential software component to be added. The potential software component may be detected by matching multiple instances of the potential component in the codebase, where the potential component has similar (within predetermined threshold ranges) of usage parameters. The potential software component and its usage parameters may be presented to an administrator for review, potential editing, and inclusion into rule engine 320. In one embodiment, AI/ML 330 monitors the addition of the potential software component, and automatically (for example, with automation subject to administrator confirmation) adds other potential software components with similar usage parameters to rule engine 320. In this way, the codebase may be autonomously enhanced by adopting user-generated reusable software components. The approved parameters of use may be automatically generated based on the range of parameters in which the user-generated reusable software component is being used, for example by adopting the minimum and maximum values of the parameters selected by the users.

—AI/ML Model—

FIG. 5 illustrates one embodiment of an example AI/ML model training process 500 for adaptive code scanning associated with detection of and adaptation to unapproved uses of software components in a body of software code. In one embodiment, during training, one or more software components 505 are provided as inputs to the neural network 510 (or other ML classification model). More particularly, descriptions of the software components 505 are provided as inputs to the neural network 510. In one embodiment, an individual input to the neural network 510 is a feature vector representation of one software component 505. In one embodiment, the feature vector for a software component may include a value that identifies the software component as an instance of a reusable software component. For example, the feature vector for the component may include component identifier number.

In one embodiment, the feature vector for a software component may include one or more values for parameters of use of the software component. In one embodiment, the feature vector for a software component include values for each of the parameters of use for the software component evaluated by the rules engine. For example, the feature vector may include one or more values describing position of the software component within software code, such as positioning of the software component as a direct child of the "body" element in HTML code. Or, for example, the feature vector may include one or more values describing inputs to the software component, such as media file type when the software component is a media player.

In one embodiment, during training, the feature values in the feature vectors are drawn from the rule engine. The adaptive code scanning method collects an identifier for a software component and parameter values representing one approved use of the software component in order to form a feature vector. The feature vectors generated from the parameters stored in the rules engine thus represent approved uses of the software components.

For training, the data representing the software components as feature vectors (also referred to for convenience as "component data") is split into a training set and a testing set. The training set of feature vectors (or set of training vectors) is used to adjust the neural network 510 to cause the neural network 510 to produce classifications that are consistent with a prescribed or known classification for the training vectors. The neural network 510 is trained using an optimization algorithm that adjusts the parameters (weights and bias values) of the neural network 510 to minimize error between neural network classification for a vector and prescribed classification for the vector (also called classification error). The testing set of feature vectors (or set of testing vectors) is used to verify or confirm that the trained neural network is producing classifications that are consistent with the prescribed or known classification for the testing vectors.

In one embodiment, neural network 510 classifies a use of a software component as approved or unapproved. In one embodiment, the resulting output classification by the neural network 510 is used as a control decision 515 linked to automated actions 520. In one embodiment, neural network 510 has more than one output. Each output controls whether or not to proceed with different automated actions 520. The automated actions 520 may include, for example: automatically adapting the code scanning system (by updating the rules engine) to approve the use of the software component; automatically modifying the code of the software component itself (based, for example, on user-composed code that interacts with the software component); automatically generating an alert or other message regarding an unapproved use of the software component; automatically flagging a use of the software component for review; or other actions as described herein.

In one embodiment, the automated action is initiated where a confidence level for the classification decision satisfies a "yes" threshold for performing the action. And, the automated action is not initiated where a confidence level for the classification decision satisfies a "no" threshold for not performing the action. Where a classification decision by the neural network 510 does not satisfy the yes or no thresholds, the adaptive code scanning system may request a user decision on whether or not to proceed with the action.

In one embodiment, the neural network 510 is iteratively trained and tested on known and new patterns 525 provided as input vectors. The iterative training and testing on known and new patterns 525 progressively increases the accuracy of classifications (e.g., of valid (approved) and non-valid (unapproved) usage configurations) by the neural network 510. And, by extension, the iterative training and testing on known and new patterns 525 progressively increases the accuracy of the resulting control decisions 515 reached by the neural network 510.

FIG. 6 illustrates one embodiment of an example AI/ML model runtime 600 for adaptive code scanning associated with detection of and adaptation to unapproved uses of software components in a body of software code. Once trained, neural network 510 becomes trained neural network 605. Trained neural network 605 may be used to classify individual component instances 610 as an approved or unapproved 615 use of a software component. The component instances 610 are represented as feature vectors (as discussed above) and provided as inputs to trained neural network 605. The classification decision may be used to control initiation of an automatic fix 620, as discussed above. For example, an automatic fix 620 may be an automated action to include the parameters in the as an approved or valid configuration for a software component. Where the trained neural network 605 determines from the input feature vector that the configuration for the software component instance 610 is unapproved 615, automatic fix 620 to add the configuration for the software component to the rules engine as an approved or valid configuration.

In another embodiment, the automatic fix 620 may automatically compose a code patch or modification based on user-generated code with which the software component instance 610 is configured to interact in the codebase. For example, the automatic fix may read or otherwise capture code associated with the component instance 610 in the codebase, and automatically add it into a new version of the software component in a similar configuration as used in the codebase. The automatic creation may be presented for user or administrator confirmation and/or editing before update to code of the software component in the library. In one embodiment, where automated creation of code fails, the update may be logged as a bug 625 (or feature) in a bug tracking system. In one embodiment, the bug tracking system may be third party bug tracking software, such as Jira.

In one embodiment, the classification decision may be used to control a creation of an incident report 630. For example, creation of incident report 630 may include an automated generation and transmission of an electronic alert that the component instance is used in an unapproved way. The alert may be directed to an alert inbox or GUI of an user or administrator, such as to the user who implemented the unapproved use of the software component. The alert may include information to educate the user about proper use of the software component.

—Example Autonomous Code Changes—

Where it turns out that a non-approved use of a component is a valid use case, then the software component itself may be automatically updated to incorporate the use case. In one embodiment, in response to determining that a software component is not used as designed (that is, implemented according to one or more valid configurations), the adaptive codescan system may choose to proceed with an automated action to revise, correct, fix, or otherwise change the code of the software component. The change to the code modifies the software component in a way that adapts to the unapproved use. Thus, autonomous code modification is one way to adapt to the implemented parameters of use for the software component.

Consider again the example of the embedded video player component discussed above. For example, the approved parameters of use indicate that the approved or designed use of the video player component is to have MP4 files as inputs. During a code scan, the scanner may detect that the majority of the instances of the software component are provided with MP4 files as inputs, but that another portion of the instances of the software component are provided with MP3 files as inputs. So, the code scan will report results (for example in a trend report) that in a significant portion of instances (for example, a number of instances exceeding a threshold between 1% and 10%) of the software component is using a different file type. Using this file type is inconsistent with the approved behavior for the software component.

In one embodiment, the adaptive codescan system may propose a fix or patch to the code of the software component. For example, the adaptive codescan system may log a suggestion that the code for the software component be modified to accept MP3 files (for example, by logging the suggestion in a bug tracking system). And, in another example, the adaptive codescan system may generate a patch to reprogram the software component to accept and process the MP3 file. For example, the adaptive codescan system may review the code surrounding the instances of the software component that are provided with MP3 files, identify the code used to configure the software component to accept the MP3 files, and automatically reprogram the software component to use the identified code in the event the input is an MP3 file. In one embodiment, the adaptive codescan system looks up and retrieves from a library one or more software code elements used to repurpose MP4 players to play MP3 files. And, the adaptive codescan system automatically reprograms the software component to use the retrieved code in the event the input is an MP3 file.

In one embodiment, the reprogramming patches to the code of the software component may be generated and recorded in the suggestion in the bug tracking system. In one embodiment, the reprogramming patches to the code of the software component may be automatically implemented in the software component. In one embodiment where the reprogramming patches to the software component are applied automatically, the reprogramming patches to the software are presented to a user for review in a user interface and confirmation (or rejection, or modification) by a user input before applying the changes to the component. In one embodiment, AI/ML 330 observes user confirmation/rejection of the automatically-generated changes to the component in conjunction with other parameters in the feature vector, and learns (through iterative training 525) that automatically-generated patches in this situation will be approved (or not approved as the case may be). AI/ML 330 may use the training to decide whether or not to generate and propose code fixes when a use of a software component is inconsistent with approved behavior. These actions may be automated actions performed autonomously by the adaptive code scanning system, for example under control of the AI/ML 330.

Thus, in one embodiment, AI/ML 330 may control performance of an automated action to reprogram, patch, or otherwise modify the code of a reusable software component. For example, where AI/ML 330 is a neural network, a neuron in the output layer determines whether a patch to the code of a software component should be automatically generated or applied. This output-layer neuron may be referred to herein as a "generate patch" neuron. In one embodiment, where the activation function (or threshold) for the generate patch neuron is satisfied, AI/ML 330 has determined that the automated action to generate and apply a patch to the code of the software component should proceed. And, where the activation function (or threshold) for the generate patch neuron is not satisfied, AI/ML 330 has determined that the automated action to generate and apply a patch to the code of the software component should not proceed. The automated action to generate and apply a patch may then proceed to automatically release the patched software component (either as a new version, or as a substitute for the existing version of the software component).

—Other Autonomous Actions—

In addition to a neuron in the output layer to control automatic generation of code fixes, other neurons in the output layer control other autonomous actions. In one embodiment, these autonomous actions present additional ways to adapt to the implemented parameters of use for the software component. For example, another neuron in the output layer determines whether or not the implemented parameters for the software component should be automatically added to the rule engine 320 as a valid configuration for the software component. This output-layer neuron may be referred to herein as an "update rules" neuron.

Yet another neuron in the output layer may control whether or not an alert should be automatically sent to a user who implemented the software component. This output-layer neuron may be referred to herein as a "generate alert" neuron. In one embodiment, the alert may include a variety of information specific to the software component. Such as, the alert may be an educational alert describing approved configurations for the reusable software component. The alert will educate or reeducate users on the approved uses of the component. In one embodiment, where the unapproved use is known to be subject to a revision or patch to the software component (or rules) that has not yet been completed (or if the revision is automatically generated, not yet approved), the alert may indicate that a fix is forthcoming. In one embodiment, where the unapproved use has been determined that it should not be adopted (based for example on previous disapprovals of the unapproved use observed by AI/ML 330) the alert may indicate that the use will not be approved. In one embodiment, more than one of these functions for the alert may be performed. The alerts may be sent to individual users or to a team of users that are associated with the unapproved use.

Still another neuron in the output layer may choose whether or not to record a use of the software component for further review in a bug tracking system (a "record bug" neuron). In response to the activation of the record bug neuron, adaptive code scanning system will search a bug tracking system to determine if the non-approved use has already been recorded as a bug. If yes, then a count of times that the non-approved use has been detected will be incremented in the bug tracking system. If not, the non-approved use will be added to the bug tracking system. Automatically placing records of non-approved uses into a bug tracking system is useful for making a record of potential enhancements for future releases, and for prioritizing the enhancements. In one embodiment, non-approved uses may be logged as bugs where the enhancements to the software component are unable to be automated, for example where a patch is too complex to be automated. Enhancements to the software component being unable to be automated may be indicated by a failure to complete an automatic generation of the patch. Recording the bug flags the use configuration for human attention or intervention outside of the scope of automation described herein.

The priority of making a change to deal with a bug may be based at least in part on the number of occurrences of the non-approved use of the software component in the bug tracking system. For example, when a potential enhancement (patch for non-approved use configuration) to a software component is logged in the bug tracker, the enhancement has a priority score associated with it. In one embodiment, the priority score is a three-value tuple that includes a severity component (for example, measured from 1 to 5), an age (measured in time, for example, days elapsed since a first addition of the enhancement to the bug tracking system), and a number of discrete user groups (such as customers) associated with the enhancement (i.e., customers who have attempted to use the software component in the non-approved configuration). In one embodiment, the priority score gets lower as the age increases.

In one embodiment, the neurons in the output layer that control the performance of an automated action are binary, expressing one of a yes/true or no/false value for proceeding with the automated action. In one embodiment, the neurons in the output layer that control the performance of an automated action are numerical, expressing a numerical value which may compared against a threshold value to arrive at a yes/true or no/false value for proceeding with the automated action. The threshold values may be set by training/retraining of the AI/ML 330 based on parameters of the feature vector and user decision(s) made for software components that the adaptive scanner has detected to be in non-approved configurations.

Other automated actions may be controlled indirectly by the neurons. For example, at the completion of a scan of a body of code (such as a codebase), a health report describing the "health" (e.g., a ratio of valid uses to overall uses) of the reusable software components in the body of code may be automatically generated and provided in an alert to a user or administrator of the body of code. In one embodiment, issuing of the health report may be based on a number of times a generate alert neuron and/or a record bug neuron was triggered. And/or, issuing of the health report may be based on a number of times a generate patch neuron and/or an update rules neuron was triggered and rejected by the user. In one embodiment, the health report may be triggered by the number satisfying a threshold of some fraction of the overall uses of the reusable software components in the body of code. For example, where the above neurons combined were triggered for more than 10% of uses of the software component (or another percentage between 1% and 50%, depending on user preferences), generation and transmission of an alert including the health report will automatically proceed.

In another simple example of application of adaptive code scanning, a search tool is implemented as a reusable software component. A search box may be placed in the header of an HTML (or other) interface page, and associated content that goes with the search box is placed elsewhere on the page. In this example, the search box is one software component and the container that include the search in the header is a different component. And, when the search is performed, the results are printed or displayed with yet another software component for displaying collections. The results (or other elements in a collection) may be displayed in a variety of different collection views, such as a list view, a table view, a graph view, etc. Administrators of the codebase that includes this page may decide that, for aesthetic design consistency in a user interface (UI) experience, a collection of search results should always be displayed as a list. Adaptive codescan system 100 can lock down and enforce the use of the list view option in the collection display software component where the collection display component is being used to display search results from a search box software component. The adaptive codescan can identify where the inputs to a collection display software component are outputs from a search box component, based on the identifiers of the respective software components. The source of the inputs to the collection display (search box) may be provided as a parameter of use, in response to which the rules will permit as valid only list view displays from the collection display component, and not approve graph, table, or other displays from the collection display component. AI/ML 330 learns that the other views are forbidden due to consistent rejection of proposed rule changes that would adopt other views.

—Electronic Alerts—

In one embodiment, an electronic alert is generated by composing and transmitting a computer-readable message. The computer readable message may include content, including machine-readable commands, human readable text, images, or other information. The content may include status information that describes a status of whether a software component is used as designed or not. Or, the content of the electronic alert may describe an extent to which a software component is consistently implemented in the software code according to the valid configuration. The content may include educational information that describes approved parameters, uses, or configurations for a software component. In one embodiment, an electronic alert may be generated and sent in response to a detection of an implemented configuration that is not valid for a software component. The electronic alert may be composed and then transmitted for subsequent presentation on a display or other action.

In one embodiment, the electronic alert is a message that is configured to be transmitted over a network, such as a wired network, a cellular telephone network, wi-fi network, or other communications infrastructure. The electronic alert may be configured to be read by a computing device. The electronic alert may be configured as a request (such as a REST request) used to trigger an action, such as addition of a new or additional valid configuration to a rule engine, or to modification of a software component in a codebase. In one embodiment, the electronic alert may be presented in a user interface such as a graphical user interface (GUI) by extracting the content of the electronic alert by a REST API or other software that has received the electronic alert.

Selected Advantages

In previous approaches, there is a lack of visibility regarding the uptake, usage, and potential configuration violations of shared infrastructure pieces such as reusable software components. This lack of information is worsened by the ever-evolving state of projects, leaving non-adaptive code scanning unable to adjust to the new conditions in which software components are used. Also, libraries of reusable software components are updated continually, and the ways software developers are using the component are also changing, and previous, non-adaptive approaches are unable to learn the component updates and new ways to use components.

In one embodiment, the adaptive codescan systems and methods improve the technology of code scanning by making the code scanning automatically self-improving. The code scan tool itself is made smart enough to generate analytic support for automated improvement of the scan tool itself and a code library. For example, adaptive codescan systems and methods may autonomously fetch, scan, apply rules/patterns, and execute analyses across extensive codebases to recognize trends and extract patterns of use that may be used to improve overall code quality. From the recognized patterns and trends, adaptive codescan systems and methods may automatically present ML-based smart recommendations or other actions. The smart actions/recommendations may be for update or revision of parameters for use of particular code components, or even for update or modification of the code components themselves. In one embodiment, the smart actions/recommendations may be automatically implemented. In one embodiment, the presented in a GUI for user confirmation during automatic implementation.

In one embodiment, adaptive codescan systems and methods improve the technology of code scanning by enabling enforcement of consistent usage of a component across a body of code while the body of code is increasing organically due to user implementations of new features, applications, pages, or other portions of the codebase. In one embodiment, adaptive codescan systems and methods improve the technology of code scanning by automatically adjusting rules or automatically generating code to adopt unapproved use cases that are nevertheless valid. In one embodiment, adaptive codescan systems and methods improve the technology of code scanning by automatically learning which unapproved uses of a software component to adopt as approved, and which unapproved uses to reject. And, in one embodiment, adaptive codescan systems and methods further improve the technology of code scanning by learning to respond to unapproved uses that will not be approved with targeted education about the approved uses of the particular software component that is being misused.

—Cloud or Enterprise Embodiments—

In one embodiment, the present system (such as adaptive codescan system 100) is a computing/data processing system including a computing application or collection of distributed computing applications for access and use by other client computing devices that communicate with the present system over a network. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, adaptive codescan system 100 is a centralized server-side application that provides at least the functions disclosed herein and that is accessed by many users by way of computing devices/terminals communicating with the computers of adaptive codescan system 100 (functioning as one or more servers) over a computer network. In one embodiment adaptive codescan system 100 may be implemented by a server or other computing device configured with hardware and software to implement the functions and features described herein.

In one embodiment, the components of adaptive codescan system 100 are implemented on one or more hardware computing devices or hosts interconnected by a data network. For example, the components of adaptive codescan system 100 may be executed by network-connected computing devices of one or more computer hardware shapes, such as central processing unit (CPU) or general-purpose shapes, dense input/output (I/O) shapes, graphics processing unit (GPU) shapes, and high-performance computing (HPC) shapes.

In one embodiment, the components of adaptive codescan system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of adaptive codescan system 100 may (i) generate or compose an electronic message or signal to issue a command or request to another component, (ii) transmit the message or signal to other components of adaptive codescan system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by adaptive codescan system 100, for example through a web interface server. In one embodiment, the remote computing system may send requests to and receive responses from adaptive codescan system 100. In one example, access to the information or applications may be effected through use of a web browser on a personal computer or mobile device. In one example, communications exchanged with adaptive codescan system 100 may take the form of remote representational state transfer (REST) requests using JavaScript object notation (JSON) as the data interchange format for example, or simple object access protocol (SOAP) requests to and from XML servers. The REST or SOAP requests may include API calls to components of adaptive codescan system 100.

—Software Module Embodiments—

In general, software instructions are designed to be executed by one or more suitably programmed processors accessing memory. Software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor of a computing device or system accessing memory or storage cause the computing system or device to perform the corresponding function(s) as described herein. For example, in one embodiment, the components of adaptive codescan system 100 may be implemented as sets of one or more software modules executed by one or more computing devices specially configured for such execution.

—Computing Device Embodiment—

Figure 7:
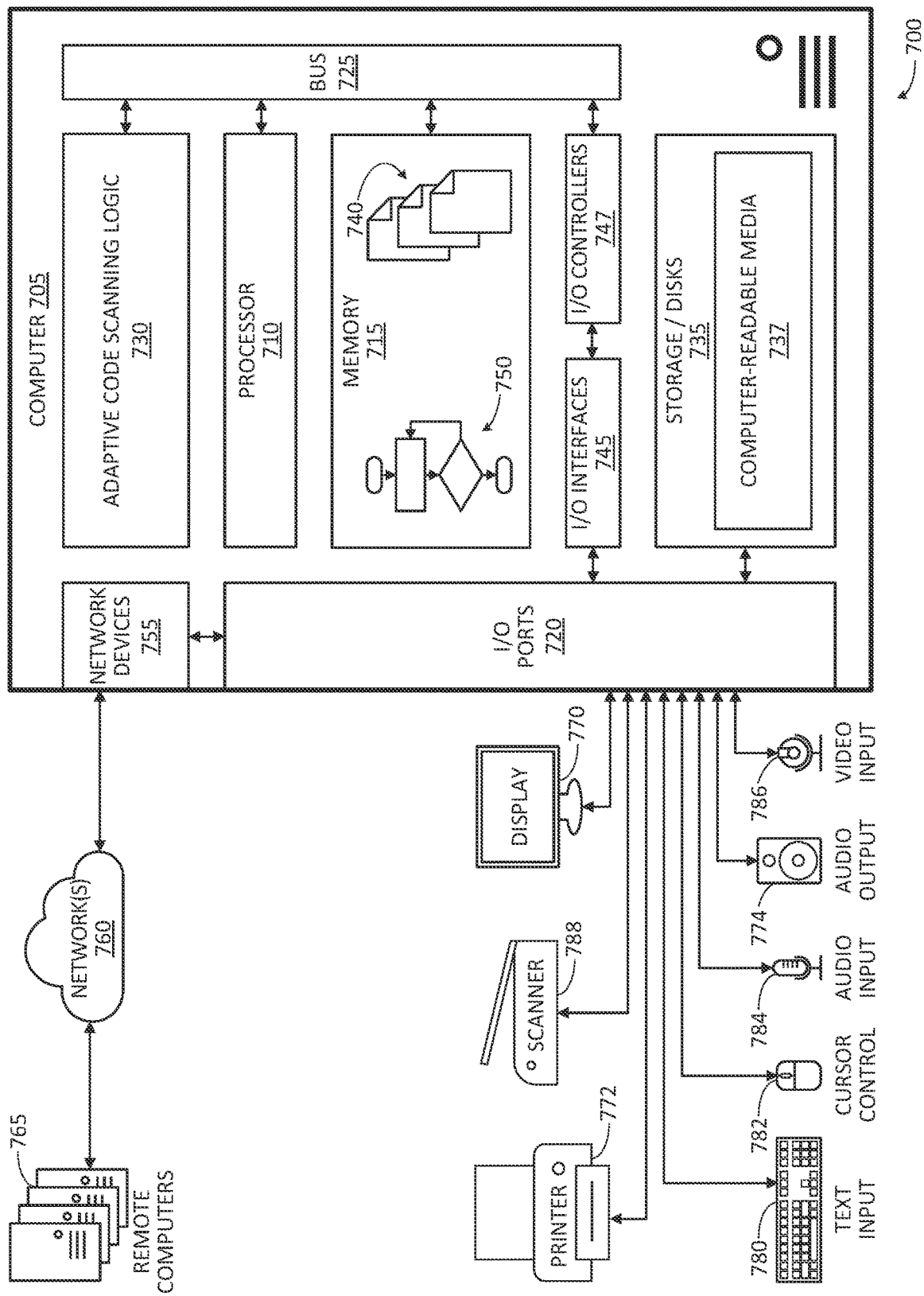
FIG. 7 illustrates an embodiment of a computing system configured with the example systems and/or methods disclosed.

FIG. 7 illustrates an example computing system 700. Example computing system 700 includes an example computing device that is configured and/or programmed as a special purpose computing device with one or more of the example systems and methods described herein, and/or equivalents. The example computing device may be a computer 705 that includes at least one hardware processor 710, a memory 715, and input/output ports 720 operably connected by a bus 725. In one example, the computer 705 may include adaptive code scanning logic 730 configured to facilitate detection of and adaptation to unapproved uses of software components in a body of software code similar to the logic, systems, methods, and other embodiments shown and described with reference to in FIGS. 1-6.

In different examples, the logic 730 may be implemented in hardware, a non-transitory computer-readable medium 737 with stored instructions, firmware, and/or combinations thereof. While the logic 730 is illustrated as a hardware component attached to the bus 725, it is to be appreciated that in other embodiments, the logic 730 could be implemented in the processor 710, stored in memory 715, or stored in disk 735.

In one embodiment, logic 730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate detection of and adaptation to unapproved uses of software components in a body of software code. The means may also be implemented as stored computer executable instructions that are presented to computer 705 as data 740 that are temporarily stored in memory 715 and then executed by processor 710.

Logic 730 may also provide means (e.g., hardware, non-transitory computer-readable medium that stores executable instructions, firmware) for performing one or more of the disclosed functions and/or combinations of the functions.

Generally describing an example configuration of the computer 705, the processor 710 may be a variety of various processors including dual microprocessor and other multi-processor architectures. A memory 715 may include volatile memory and/or non-volatile memory. Non-volatile memory may include, for example, ROM, PROM, and so on. Volatile memory may include, for example, RAM, SRAM, DRAM, and so on.

A storage disk 735 may be operably connected to the computer 705 via, for example, an input/output (I/O) interface (e.g., card, device) 745 and an input/output port 720 that are controlled by at least an input/output (I/O) controller 747. The disk 735 may be, for example, a magnetic disk drive, a solid-state disk drive, a floppy disk drive, a tape drive, a Zip drive, a flash memory card, a memory stick, and so on. Furthermore, the disk 735 may be a CD-ROM drive, a CD-R drive, a CD-RW drive, a DVD ROM, and so on. The memory 715 can store a process 750 and/or a data 740, for example. The disk 735 and/or the memory 715 can store an operating system that controls and allocates resources of the computer 705.

The computer 705 may interact with, control, and/or be controlled by input/output (I/O) devices via the input/output (I/O) controller 747, the I/O interfaces 745, and the input/output ports 720. Input/output devices may include, for example, one or more displays 770, printers 772 (such as inkjet, laser, or 3D printers), audio output devices 774 (such as speakers or headphones), text input devices 780 (such as keyboards), cursor control devices 782 for pointing and selection inputs (such as mice, trackballs, touch screens, joysticks, pointing sticks, electronic styluses, electronic pen tablets), audio input devices 784 (such as microphones or external audio players), video input devices 786 (such as video and still cameras, or external video players), image scanners 788, video cards (not shown), disks 735, network devices 755, and so on. The input/output ports 720 may include, for example, serial ports, parallel ports, and USB ports.

The computer 705 can operate in a network environment and thus may be connected to the network devices 755 via the I/O interfaces 745, and/or the I/O ports 720. Through the network devices 755, the computer 705 may interact with a network 760. Through the network, the computer 705 may be logically connected to remote computers 765. Networks with which the computer 705 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"Plurality", as used herein, refers to more than one of a thing, item, or entity, thereby indicating a state of being plural.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:
    defining a valid configuration for a software component, wherein the valid configuration specifies approved parameters of use;
    scanning software code to detect that the software component exists in the software code;
    in response to detection of the software component, scanning the software code to identify implemented parameters of use for the software component;
    comparing the implemented parameters of use to the approved parameters of use;
    based on the comparison, determining that the software component is not implemented in the software code according to the valid configuration;
    in response to the determination that the software component is not implemented according to the valid configuration, automatically determining to proceed with an automated action based at least in part on the implemented parameters of use, by:
        (1) determining that there is a trend of implementing the software component in a particular way that is not according to the valid configuration based on a similarity of implemented parameters of use in a plurality of instances of the software component, and
        (2) determining that the trend satisfies a threshold for performing the automated action; and
    performing the automated action to adapt to the implemented parameters of use for the software component, wherein the automated action is performed in response to satisfaction of the threshold.

2. The computer-implemented method of claim 1, further comprising training a machine learning model to decide whether to proceed with the automated action based at least in part on feature vectors of the approved parameters of use, wherein automatically determining to proceed with the automated action based at least in part on the implemented parameters of use is made by the trained machine learning model.

3. The computer-implemented method of claim 1, wherein performing the automated action further comprises automatically defining an additional valid configuration for the software component based on the implemented parameters of use.

4. The computer-implemented method of claim 1, wherein performing the automated action further comprises automatically modifying the software component based on the implemented parameters of use.

5. The computer-implemented method of claim 1, wherein performing the automated action further comprises:
    generating an electronic alert that indicates that the software component is not implemented in the software code according to the valid configuration, wherein the electronic alert includes information describing the approved parameters of use for the software component; and
    transmitting the electronic alert to a user interface for a user associated with the software component.

6. The computer-implemented method of claim 1, further comprising describing a position of the software component within the software code in the approved parameters of use.

7. The computer-implemented method of claim 1, further comprising describing an input or an output of the software component in the approved parameters of use.

8. The computer-implemented method of claim 1, wherein performing the automated action further comprises recording the implemented parameters of use for the software component in a log, the method further comprising generating a priority for revision of the software component to accommodate the implemented parameters based at least in part on a quantity of uses of the software component with the implemented parameters.

9. The computer-implemented method of claim 1, further comprising:
    automatically presenting a graphical user interface showing valid and invalid usages of the software component within the software code;
    automatically defining an additional valid configuration for the software component based on the implemented parameters of use in order to automatically apply the automated action; and
    automatically update the graphical user interface to show updated valid and invalid usages of the software component within the software code based on the additional valid configuration.

10. A non-transitory computer-readable medium that includes stored thereon computer-executable instructions that when executed by at least a processor of a computer cause the computer to:
    define a valid configuration for a software component, wherein the valid configuration specifies approved parameters of use;
    train a machine learning model to decide whether to proceed with an automated action based at least in part on training feature vectors of the approved parameters of use;
    scan software code to detect that the software component exists in the software code;
    in response to detection of the software component, scan the software code to identify implemented parameters of use for the software component;
    compare the implemented parameters of use to the approved parameters of use;
    based on the comparison, determine that the software component is not implemented in the software code according to the valid configuration;
    write the implemented parameters of use into an input feature vector;
    in response to the determination that the software component is not implemented according to the valid configuration, automatically determine by the trained machine learning model to proceed with the automated action by generating an estimated outcome for the automated action from the input feature vector of the implemented parameters of use; and
    in response to the estimated outcome, trigger performance of the automated action to adapt the approved parameters of use for the software component based on the implemented parameters of use.

11. The non-transitory computer-readable medium of claim 10, wherein the instructions further cause the computer to train the machine learning model to choose the automated action to be performed from among a plurality of actions, wherein the choice is based at least in part on the implemented parameters and a user input to confirm the choice by the machine learning model of the automated action, and wherein the automatic determination to proceed with the automated action further comprises choosing the automated action by the trained machine learning model.

12. The non-transitory computer-readable medium of claim 10, wherein the instructions further cause the computer to:
    determine that multiple users are implementing the software component in a particular way that is not according to the valid configuration based on a similarity of implemented parameters of use in a plurality of instances of the software component; and
    determine that the plurality of instances satisfies a threshold for performing the automated action, wherein the automated action is performed in response to satisfaction of the threshold.

13. The non-transitory computer-readable medium of claim 10, wherein the instructions to perform the automated action further cause the computer to (i) automatically define an additional valid configuration for the software component based on the implemented parameters of use; or (ii) automatically modify the software component based on the implemented parameters of use.

14. The non-transitory computer-readable medium of claim 10, wherein the approved parameters of use describe one or more of (i) a position of the software component within the software code, and (ii) an input or an output of the software component.

15. A computing system, comprising:
    at least one processor;
    at least one memory connected to the at least one processor;
    a non-transitory computer readable medium including instructions stored thereon that when executed by at least the processor cause the computing system to:
    define a valid configuration for a software component, wherein the valid configuration specifies approved parameters of use;
    train a machine learning model to decide whether to proceed with an automated action based at least in part on training feature vectors that include the approved parameters of use;
    scan software code to detect that the software component exists in the software code;
    in response to detection of the software component, scan the software code to identify implemented parameters of use for the software component;
    determine that the software component is not implemented in the software code according to the valid configuration based on a difference between the implemented parameters of use and the approved parameters of use;
    write into an input feature vector (1) the implemented parameters of use and (2) information about multiple users implementing the software component according to the implemented parameters of use;
    in response to the determination that the software component is not implemented according to the valid configuration, automatically determine by the trained machine learning model to proceed with the automated action by generating an estimated outcome for the automated action from the input feature vector of the implemented parameters of use and the information about the multiple users; and
    perform the automated action to adapt to the implemented parameters of use for the software component in response to the estimated outcome.

16. The computing system of claim 15, wherein the instructions further cause the computing system to train the machine learning model based at least in part on the implemented parameters and a user input to confirm the choice by the machine learning model of the automated action in response to the determination that the software component is not implemented in the software code according to the valid configuration.

17. The computing system of claim 15, wherein the instructions to perform the automated action further cause the computing system to:
   determine that the multiple users are implementing the software component not according to the valid configuration based on a similarity of implemented parameters of use in a plurality of instances of the software component; and
   determine that the plurality of instances satisfies a threshold for automatically applying the automated action, wherein the automated action is automatically applied in response to satisfaction of the threshold.

18. The computing system of claim 15, wherein the instructions to perform the automated action further cause the computing system to (i) automatically define an additional valid configuration for the software component based on the implemented parameters of use; or (ii) automatically modify the software component based on the implemented parameters of use.

19. The computing system of claim 15, wherein the approved parameters of use describe one or more of (i) a position of the software component within the software code, and (ii) an input or an output of the software component.

20. The computing system of claim 15, wherein the machine learning model is a neural network that is configured to generate a plurality of estimated outcomes for classifying whether to proceed with a corresponding plurality of automated actions, wherein the plurality of estimated outcomes includes the estimated outcome, and wherein the plurality of automated actions includes the automated action.

* * * * *